US012181834B2

(12) United States Patent
Nakamura et al.

(10) Patent No.: US 12,181,834 B2
(45) Date of Patent: Dec. 31, 2024

(54) ELECTROSTATIC IMAGE DEVELOPING TONER SET AND ELECTROSTATIC IMAGE DEVELOPER SET

(71) Applicant: FUJIFILM Business Innovation Corp., Tokyo (JP)

(72) Inventors: Yukiaki Nakamura, Kanagawa (JP); Kana Nagashima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 479 days.

(21) Appl. No.: 17/497,137

(22) Filed: Oct. 8, 2021

(65) Prior Publication Data

US 2022/0390869 A1 Dec. 8, 2022

(30) Foreign Application Priority Data

May 25, 2021 (JP) ................................ 2021-087894

(51) Int. Cl.

*G03G 9/09* (2006.01)
*G03G 9/08* (2006.01)
*G03G 9/087* (2006.01)

(52) U.S. Cl.

CPC ......... *G03G 9/0902* (2013.01); *G03G 9/0819* (2013.01); *G03G 9/08711* (2013.01); *G03G 9/08755* (2013.01); *G03G 9/0926* (2013.01)

(58) Field of Classification Search

CPC ........... G03G 9/08755; G03G 9/08711; G03G 9/0926; G03G 9/0902

See application file for complete search history.

(56) References Cited

U.S. PATENT DOCUMENTS

2014/0193751 A1 7/2014 Sugitate et al.
2017/0285518 A1 10/2017 Hara et al.
2018/0217535 A1 8/2018 Koido

FOREIGN PATENT DOCUMENTS

JP 2014-173251 * 7/2014 ............... G03G 9/09
JP 2016-48310 A 4/2016
JP 2018-45090 A 3/2018
JP 6417792 B2 11/2018
JP 2019-56783 A 4/2019
JP 2019-61096 A 4/2019
JP 2019-101072 * 6/2019 ............... G03G 9/08
JP 2021-081679 A 5/2021

OTHER PUBLICATIONS

Translation of JP 2014-173251.*
Translation of JP 2019-101072.*
Extended European Search Report dated May 23, 2022 from the European Patent Office in EP Application No. 21211573.7.
Notice of Reasons for Refusal dated Oct. 15, 2024 in Application No. 2021-087894.

* cited by examiner

*Primary Examiner* — Peter L Vajda
(74) *Attorney, Agent, or Firm* — Sughrue Mion, PLLC

(57) ABSTRACT

An electrostatic image developing toner set includes a brilliant toner having brilliant toner particles that include a binder resin and a brilliant pigment, and a color toner having color toner particles that include a binder resin and a colorant other than the brilliant pigment. The binder resin included in the brilliant toner particles and the binder resin included in the color toner particles are incompatible with each other.

12 Claims, 3 Drawing Sheets

ELECTROSTATIC IMAGE DEVELOPING TONER SET AND ELECTROSTATIC IMAGE DEVELOPER SET

CROSS-REFERENCE TO RELATED APPLICATIONS

This application is based on and claims priority under 35 USC 119 from Japanese Patent Application No. 2021-087894 filed May 25, 2021.

BACKGROUND

(i) Technical Field

The present disclosure relates to an electrostatic image developing toner set and an electrostatic image developer set.

(ii) Related Art

Japanese Patent No. 6417792 discloses "a toner set including toners that form a secondary color and a toner that does not form a secondary color, wherein when, of the toners that form a secondary color, a toner that includes a binder resin having a maximum solubility parameter value (SP value: $(cal/cm^3)^{1/2}$) is defined as a first toner and another toner that includes a binder resin having a minimum solubility parameter value is defined as a second toner, the toner that does not form a secondary color is defined as a third toner, and the solubility parameter values (SP values: $(cal/cm^3)^{1/2}$) of the binder resins of the first toner, the second toner, and the third toner are represented by SP(1), SP(2), and SP(3), respectively, the following inequalities (1) to (3) are satisfied:

$$SP(1)-SP(2)<0.15 \quad (1)$$

$$0.15\leq|SP(1)-SP(3)|<1.0 \quad (2)$$

$$0.15\leq|SP(2)-SP(3)|<1.0 \quad (3), \text{ and}$$

the third toner includes a white colorant but does not include a crystalline resin".

SUMMARY

Aspects of non-limiting embodiments of the present disclosure relate to an electrostatic image developing toner set that enables formation of a brilliant image having high glossiness as well as high brilliance compared with a case where an electrostatic image developing toner set includes a brilliant toner having brilliant toner particles that include a binder resin and a brilliant pigment, and a color toner having color toner particles that include a binder resin and a colorant other than the brilliant pigment, in which the binder resin included in the brilliant toner particles and the binder resin included in the color toner particles are compatible with each other, or an absolute value of a difference in solubility parameter between the binder resin included in the brilliant toner particles and the binder resin included in the color toner particles is less than 0.5 or more than 2.0.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an electrostatic image developing toner set including a brilliant toner having brilliant toner particles that include a binder resin and a brilliant pigment, and a color toner having color toner particles that include a binder resin and a colorant other than the brilliant pigment, wherein the binder resin included in the brilliant toner particles and the binder resin included in the color toner particles are incompatible with each other.

BRIEF DESCRIPTION OF THE DRAWINGS

Exemplary embodiments of the present disclosure will be described in detail based on the following figures, wherein.

DETAILED DESCRIPTION

Figure 1:
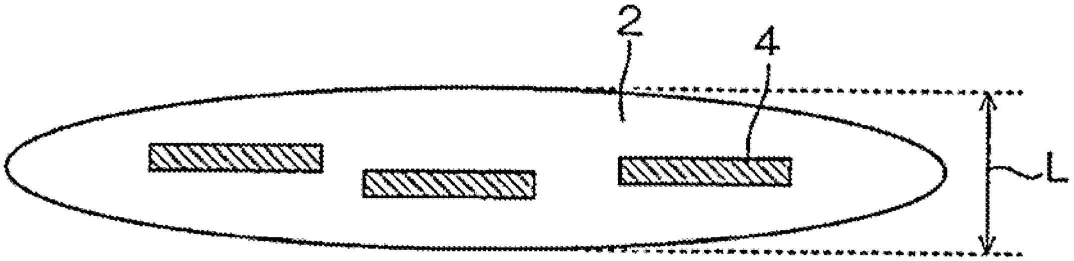
FIG. 1 is a sectional view that schematically illustrates an example of a brilliant toner particle according to an exemplary embodiment.

An electrostatic image developing toner set, an electrostatic image developer set, a toner cartridge set, a process cartridge, an image forming apparatus, and a method for forming an image according to exemplary embodiments of the present disclosure will now be described in detail.

The following descriptions and Examples merely illustrate examples of the exemplary embodiments and do not limit the scope of the disclosure.

In numerical ranges described stepwise in the present specification, the upper limit or the lower limit of one numerical range may be substituted with an upper limit or a lower limit of a different numerical range described stepwise. In numerical ranges described in the present specification, the upper limit or the lower limit of any numerical range may be substituted with a value described in Examples.

Each component may contain two or more corresponding substances.

When the amount of a component in a composition is described and there are two or more substances corresponding to the component in the composition, the amount of the component is the total amount of the two or more substances contained in the composition unless otherwise noted.

Toner Set

An electrostatic image developing toner set (hereinafter, an electrostatic image developing toner set may be simply referred to as a toner set) according to a first exemplary embodiment includes a brilliant toner having brilliant toner particles that include a binder resin and a brilliant pigment, and a color toner having color toner particles that include a binder resin and a colorant other than the brilliant pigment.

The binder resin included in the brilliant toner particles and the binder resin included in the color toner particles are incompatible with each other.

Examples of the color toner that can be included in a toner set according to the exemplary embodiment (a toner set that corresponds to each of the toner sets according to the first and second exemplary embodiments; the same applies hereinafter) include publicly known toners such as a magenta toner, a cyan toner, a yellow toner, a black toner, a red toner, a green toner, a blue toner, an orange toner, and a violet toner.

In the present exemplary embodiment, "being incompatible" means that a value of haze (degree of cloudiness) H measured by the following procedure is 20 or more and 100 or less.

One gram of a brilliant toner and 1 g of a color toner, the toners being measurement targets, are weighed and added to 20 g of tetrahydrofuran. The tetrahydrofuran to which the brilliant toner and the color toner are added is stirred at 25° C. to dissolve binder resins included in the brilliant toner and the color toner. Subsequently, the resulting solution is filtered by suction through filter paper (trade name: Filter Paper Qualitative (No. 2, 110 mm) manufactured by ADVANTEC TOYO KAISHA, LTD.). The mother liquor obtained by the filtration is applied to an OHP film (product name: OHP film for PPC laser, manufactured by KISO Chemical Corporation) with a bar coater and dried at 25° C. to form, on the OHP film, a coating film containing the binder resins (area of coating film: 40 mm×25 mm, mass of coating film: 0.008 g). The OHP film on which the coating film containing the binder resins has been formed is used as a measurement sample, and the haze of the measurement sample is measured with a fully automatic haze meter (Model: TC-HIII DP, manufactured by Tokyo Denshoku Co., Ltd.) in accordance with JIS K7136:2000 "Plastics-Determination of haze for transparent materials".

With the configuration described above, the toner set according to the first exemplary embodiment enables formation of a brilliant image having high glossiness as well as high brilliance. The reason for this is probably as follows.

In order to produce a high-quality appearance in the image formation of, for example, publications and paper packages, an image having a metallic color may be formed with a toner set including a brilliant toner having brilliant toner particles that include a binder resin and a brilliant pigment, and a color toner having color toner particles that include a binder resin and a colorant other than the brilliant pigment.

In the related art, when an image is formed with a toner set including a brilliant toner and a color toner, brilliance and glossiness of the resulting image may decrease in some cases. The image formation using such a toner set including a brilliant toner and a color toner is performed by, for example, causing the brilliant toner and the color toner to adhere to a recording medium in this order, and then applying pressure from above the color toner to fix the toners. The brilliant pigment contained in the brilliant toner has a flat shape and is oriented along the surface of a recording medium during fixing to thereby exhibit brilliance. During fixing of the toners, a release agent that is contained in the brilliant toner and is present between the brilliant pigment and the recording medium moves a long distance to the image surface. In addition, if the binder resin contained in the brilliant toner and the binder resin contained in the color toner are compatible with each other during fixing, in order that the release agent contained in the brilliant toner reaches the image surface, the release agent must pass through not only a layer of the binder resin contained in the brilliant toner but also a layer of the binder resin contained in the color toner, the layer being present as an upper layer. Therefore, during fixing, the time taken for the release agent contained in the brilliant toner to reach the image surface tends to be long. Consequently, the release agent contained in the brilliant toner may not reach the image surface and may be left in the image. In such a case, when the image is irradiated with light, the release agent present in the image is irradiated with the light, and diffused reflection light tends to be generated. Consequently, brilliance of the resulting image may be decreased in some cases.

In the toner set according to the first exemplary embodiment, the binder resin included in the brilliant toner particles and the binder resin included in the color toner particles are incompatible with each other. Therefore, when the image formation using a toner set including a brilliant toner and a color toner is performed by, for example, causing the brilliant toner and the color toner to adhere to a recording medium in this order, and then applying pressure from above the color toner to fix the toners, an interface is easily generated between the brilliant toner and the color toner during fixing. Therefore, the release agent contained in the brilliant toner easily moves through the interface to the image surface. Accordingly, in the release agent contained in the brilliant toner, even the release agent that is present between the brilliant pigment and a recording medium easily move to the image surface. Thus, the amount of release agent left in the image is reduced, and the resulting image tends to have high brilliance.

In addition, an image including a metallic color may also have glossiness in order to further enhance the high-quality appearance. In an image formed with the toner set according to the first exemplary embodiment, the amount of release agent left in the image tends to decrease as described above. Consequently, the amount of release agent present on the image surface is easily increased, and the image tends to have high glossiness.

From the foregoing description, it is assumed that, with the configuration described above, the toner set according to the first exemplary embodiment enables formation of a brilliant image having high glossiness as well as high brilliance.

A toner set according to a second exemplary embodiment includes a brilliant toner having brilliant toner particles that include a binder resin and a brilliant pigment, and a color toner having color toner particles that include a binder resin and a colorant other than the brilliant pigment.

The difference in solubility parameter between the binder resin included in the brilliant toner particles and the binder resin included in the color toner particles is 0.5 or more and 2.0 or less.

In the present exemplary embodiment, the "solubility parameter (SP value)" is a value calculated by the Fedors method. Specifically, the solubility parameter (SP value) is calculated by the following formula in accordance with, for example, the description of Polym. Eng. Sci., vol. 14, p. 147 (1974)

$$\text{SP value}=\sqrt{(Ev/v)}=\sqrt{(\Sigma\Delta ei/\Sigma\Delta vi)} \qquad \text{Formula:}$$

(In the formula, Ev: evaporation energy (cal/mol), v: molar volume ($cm^3$/mol), Δei: evaporation energy of each atom or each atomic group, and Δvi: molar volume of each atom or each atomic group.)

A unit $(cal/cm^3)^{1/2}$ is adopted for the solubility parameter (SP value); however the unit is omitted according to the practice, and the solubility parameter is expressed as a dimensionless value.

With the configuration described above, the toner set according to the second exemplary embodiment enables formation of a brilliant image having high glossiness as well as high brilliance. The reason for this is probably as follows.

When the difference in solubility parameter between the binder resin included in the brilliant toner particles and the binder resin included in the color toner particles is in the range of 0.5 or more and 2.0 or less, the binder resin included in the brilliant toner particles and the binder resin included in the color toner particles easily become incompatible with each other. Therefore, when the image formation using a toner set including a brilliant toner and a color toner is performed by, for example, causing the brilliant toner and the color toner to adhere to a recording medium in this order, and then applying pressure from above the color toner to fix the toners, an interface is easily generated between the brilliant toner and the color toner during fixing. Accordingly, for the same reason as that in the toner set according to the first exemplary embodiment, smoothness of the surface of the resulting image is easily improved, and the image tends to have high glossiness.

Accordingly, it is assumed that, with the configuration described above, the toner set according to the second exemplary embodiment enables formation of a brilliant image having high glossiness as well as high brilliance.

A toner set that corresponds to each of the toner sets according to the first and second exemplary embodiments (hereinafter also referred to as a "toner set according to the present exemplary embodiment") will be described in detail below. However, an example of the toner set according to the present disclosure may be a toner set that corresponds to one of the toner sets according to the first and second exemplary embodiments.

Brilliant Toner

A brilliant toner of the present exemplary embodiment included in the toner set of the present exemplary embodiment will be described below.

Specifically, the brilliant toner according to the present exemplary embodiment preferably has a ratio (X/Y) of 2 or more and 100 or less where X represents a reflectance at an acceptance angle of +30° and Y represents a reflectance at an acceptance angle of −30°, A and B being measured when a solid image formed with the brilliant toner is irradiated with incident light at an incident angle of −45° using a goniophotometer.

A ratio (X/Y) of 2 or more means that reflection on a side (plus-angle side) opposite to a side (minus-angle side) on which the incident light is applied is larger than reflection on the side (minus-angle side) on which the incident light is applied, that is, diffuse reflection of the incident light is reduced. When diffuse reflection, in which incident light is reflected in various directions, occurs and the reflected light thereof is visually observed, colors appear to be dull. Therefore, at a ratio (X/Y) of less than 2, even when the reflected light is viewed, glossiness cannot be observed, and the brilliance may be poor in some cases.

In contrast, at a ratio (X/Y) of more than 100, a viewing angle at which the reflected light is visible becomes excessively narrow and a regular-reflection light component increases. As a result, an image may be viewed as a dark image depending on the viewing angle.

The ratio (X/Y) is more preferably 4 or more and 50 or less, still more preferably 6 or more and 20 or less, and particularly preferably 8 or more and 15 or less from the viewpoints of brilliance and manufacturability of the toner.

Measurement of Ratio (X/Y) with Goniophotometer

First, the incident angle and the acceptance angle will be described. In the measurement with a goniophotometer in the present exemplary embodiment, the incident angle is set to −45°. This is because a high measurement sensitivity is provided for images having a wide range of glossiness.

The reason why the acceptance angle is set to −30° and +30° is that the highest measurement sensitivity is provided in the evaluation of images with brilliance and images with no brilliance.

Next, a method for measuring the ratio (X/Y) will be described.

Incident light at an incident angle of −45° is applied to an image (brilliant image) to be measured, and a reflectance X at an acceptance angle of +30° and a reflectance Y at an acceptance angle of −30° are measured by using, as a goniophotometer, a GC5000L variable angle spectral color-difference meter manufactured by Nippon Denshoku Industries Co., Ltd. Each of the reflectance X and the reflectance Y is measured with respect to light having a wavelength in the range of 400 nm to 700 nm at intervals of 20 nm and defined as the average of the reflectances at respective wavelengths. The ratio (X/Y) is calculated from these measurement results.

The toner according to the present exemplary embodiment may satisfy the following requirements (1) and (2) from the viewpoint of satisfying the ratio (X/Y) described above.

(1) A brilliant toner particle has an average equivalent-circle diameter D larger than an average maximum thickness C.

(2) When a cross section of a brilliant toner particle in a thickness direction is observed, a ratio of brilliant pigment particles having a long axis direction that forms an angle of −30° to +30° with respect to a long axis direction in the cross section of the brilliant toner particle is 60% or more based on the total of brilliant pigment particles observed.

When a brilliant toner particle has a flat shape in which the equivalent-circle diameter is larger than the thickness (refer to FIG. 1), in a fixing step of image formation, the flat-shaped brilliant toner particle is assumed to be arranged by the pressure during fixing such that the flat surface of the brilliant toner particle faces a surface of a recording medium. In FIG. 1, a brilliant toner particle 2 includes brilliant pigment particles 4 and has a thickness L thereof.

Accordingly, among the brilliant pigment particles having a flat shape (flaky shape) and contained in this brilliant toner particle, brilliant pigment particles that satisfy the requirement "having a long axis direction that forms an angle of −30° to +30° with respect to a long axis direction in the cross section of the toner" described in (2) above are assumed to be arranged such that the surface side that provides the maximum area faces the surface of the recording medium. It is assumed that when an image formed in this manner is irradiated with light, the proportion of brilliant pigment particles that cause diffuse reflection of incident light is reduced, and thus the ratio (X/Y) in the range described above is achieved.

Details of the brilliant toner according to the present exemplary embodiment will now be described.

Brilliant toner particles contained in the brilliant toner according to the present exemplary embodiment include a brilliant pigment and a binder resin. The brilliant toner particles according to the present exemplary embodiment may optionally contain other components.

Brilliant Toner Particle

Average Maximum Thickness C and Average Equivalent-Circle Diameter D of Brilliant Toner Particle The brilliant toner particle may have a flat shape and preferably has an average equivalent-circle diameter D larger than an average maximum thickness C thereof. A ratio (C/D) of the average maximum thickness C to the average equivalent-circle diameter D is more preferably in the range of 0.001 or more and 0.700 or less, still more preferably 0.100 more and 0.600 or less, and particularly preferably 0.300 or more and 0.450 or less.

When the ratio (C/D) is 0.001 or more, the strength of the brilliant toner particles is ensured, breakage caused by a stress during image formation is suppressed, and a decrease in charging caused by exposure of the pigment and fogging caused as a result of this decrease are suppressed. On the other hand, at a ratio (C/D) of 0.700 or less, good brilliance is obtained.

The average maximum thickness C and the average equivalent-circle diameter D are measured by the following methods.

Brilliant toner particles are placed on a flat and smooth surface and evenly dispersed by applying vibrations. For 1,000 brilliant toner particles, each of the particles is observed with a color laser microscope "VK-9700" (manufactured by Keyence Corporation) at a magnification of 1,000 times to measure the maximum thickness C and the equivalent-circle diameter D at the surface viewed from above. The arithmetic averages thereof are calculated to determine the average maximum thickness C and the average equivalent-circle diameter D.

Angle Formed by Long Axis Direction in Cross Section of Brilliant Toner Particle and Long Axis Direction of Brilliant Pigment Particle When a cross section of a brilliant toner particle in the thickness direction is observed, a ratio (on a number basis) of brilliant pigment particles having a long axis direction that forms an angle of −30° to +30° with respect to a long axis direction in the cross section of the brilliant toner particle is preferably 60% or more based on the total of brilliant pigment particles observed. Furthermore, the ratio is more preferably 70% or more and 95% or less, and particularly preferably 80% or more and 90% or less.

When the ratio is 60% or more, better brilliance is obtained.

A method for observing a cross section of brilliant toner particles will be described.

Brilliant toner particles are embedded in a mixture of a bisphenol A-type liquid epoxy resin and a curing agent, and a sample for cutting is then prepared. Next, the sample for cutting is cut at −100° C. by using a cutting machine with a diamond knife, for example, an ultramicrotome device (UltracutUCT, manufactured by Leica Microsystems) to prepare a sample for observation. The resulting sample is observed with an ultra-high resolution field-emission scanning electron microscope (S-4800, manufactured by Hitachi High-Technologies Corporation) at a magnification at which about one to about ten brilliant toner particles are viewed in one field of view.

Specifically, cross sections of brilliant toner particles (cross sections in the thickness direction of the brilliant toner particles) are observed. With regard to 100 observed brilliant toner particles, the number of brilliant pigment particles having a long axis direction that forms an angle in the range of −30° to +30° with respect to a long axis direction in the cross section of the corresponding brilliant toner particle is counted by using image analysis software, such as image analysis software (WinROOF) manufactured by MITANI CORPORATION, or an output sample of an observed image and a protractor, and the ratio of the number of brilliant pigment particles is calculated.

The volume-average particle size of the brilliant toner particles is preferably 3 μm or more and 30 μm or less and more preferably 5 μm or more and 20 μm or less.

Average particle sizes and particle size distribution indices of brilliant toner particles are measured by using Coulter Multisizer II (manufactured by Beckman Coulter Inc.) with ISOTON-II (manufactured by Beckman Coulter Inc.) as the electrolyte.

In the measurement, 0.5 mg or more and 50 mg or less of a measurement sample is added to 2 mL of a 5% aqueous solution of a surfactant (such as sodium alkylbenzene sulfonate) serving as a dispersing agent. The resulting mixture is added to 100 mL or more and 150 mL or less of the electrolyte.

The electrolyte in which the sample has been suspended is subjected to dispersion treatment for one minute with an ultrasonic disperser, and the particle size distribution of the particles having a particle size in the range of 2 μm or more and 60 μm or less is measured by using Coulter Multisizer II with an aperture having a diameter of 100 μm. The number of particles sampled is 50,000.

Cumulative distributions of the volume and the number are plotted from the small size side with respect to the particle size ranges (channels) that are divided on the basis of the measured particle size distribution. The particle sizes at a cumulative frequency of 16% are defined as a volume particle size D16v and a number particle size D16p. The particle sizes at a cumulative frequency of 50% are defined as a volume-average particle size D50v and a cumulative number-average particle size D50p. The particle sizes at a cumulative frequency of 84% are defined as a volume particle size D84v and a number particle size D84p.

With these values, a volume particle size distribution index (GSDv) is calculated as $(D84v/D16v)^{1/2}$ and a number particle size distribution index (GSDp) is calculated as $(D84p/D16p)^{1/2}$.

A ratio (aspect ratio) of an average length of brilliant toner particles in the long axis direction when an average length of the brilliant toner particles in the thickness direction is assumed to be 1 is preferably 1.5 or more and 15 or less, more preferably 2 or more and 10 or less, and still more preferably 3 or more and 8 or less.

The average length of brilliant toner particles in the thickness direction and the average length in the long axis direction are measured as follows. Brilliant toner particles are placed on a flat and smooth surface and evenly dispersed by applying vibrations. For 1,000 brilliant toner particles, each of the particles is observed with a color laser microscope "VK-9700" (manufactured by Keyence Corporation) at a magnification of 1,000 times to measure the maximum thickness and the length in the long axis direction at the surface viewed from above. The arithmetic averages thereof are calculated to determine the average length in the thickness direction and the average length in the long axis direction.

Components that form the brilliant toner according to the present exemplary embodiment will be described below.

Binder Resin

Examples of the binder resin include vinyl resins such as homopolymers obtained from monomers such as styrenes (e.g., styrene, parachlorostyrene, and α-methylstyrene), (meth)acrylates (e.g., methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (e.g., acrylonitrile and methacrylonitrile), vinyl ethers (e.g., vinyl methyl ether and vinyl isobutyl ether), vinyl ketones (e.g., vinyl methyl ketone, vinyl ethyl ketone, and vinyl isopropenyl ketone), and olefins (e.g., ethylene, propylene, and butadiene), and copolymers obtained from a combination of two or more of these monomers.

Examples of the binder resin further include non-vinyl resins such as epoxy resins, polyester resins, polyurethane resins, polyamide resins, cellulose resins, polyether resins, and modified rosin, mixtures of these non-vinyl resins and the aforementioned vinyl resins, and graft polymers obtained by polymerizing a vinyl monomer in the presence of any of these resins.

Of these, a styrene-acrylic resin or a polyester resin is preferably used.

These binder resins may be used alone or in combination of two or more thereof.

Styrene-Acrylic Resin

The styrene-acrylic resin may be, for example, a copolymer obtained by copolymerization of at least a styrene and a (meth)acrylate. The styrene-acrylic resin may be a copolymer obtained by copolymerization of other monomers besides the styrene and the (meth)acrylate.

The term "(meth)acrylic" or the like is an expression including both "acrylic" and "methacrylic" or the like.

The styrenes are monomers having a styrene skeleton. Specific examples thereof include styrene; vinylnaphthalene; alkyl-substituted styrenes such as α-methylstyrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, and p-n-dodecylstyrene; aryl-substituted styrenes such as p-phenylstyrene; alkoxy-substituted styrenes such as p-methoxystyrene; halogen-substituted styrenes such as p-chlorostyrene and 3,4-dichlorostyrene; nitro-substituted styrenes such as m-nitrostyrene, o-nitrostyrene, and p-nitrostyrene; and fluorine-substituted styrenes such as 4-fluorostyrene and 2,5-difluorostyrene. Of these styrenes, for example, styrene, p-ethylstyrene, and p-n-butylstyrene are preferred.

These styrenes may be used alone or in combination of two or more thereof.

The (meth)acrylates are monomers having a structure obtained by esterifying (meth)acrylic acid. Specific examples thereof include alkyl (meth)acrylates such as n-methyl (meth)acrylate, n-ethyl (meth)acrylate, n-propyl (meth)acrylate, n-butyl (meth)acrylate, n-pentyl (meth)acrylate, n-hexyl (meth)acrylate, n-heptyl (meth)acrylate, n-octyl (meth)acrylate, n-decyl (meth)acrylate, n-dodecyl (meth) acrylate, n-lauryl (meth)acrylate, n-tetradecyl (meth) acrylate, n-hexadecyl (meth)acrylate, n-octadecyl (meth) acrylate, isopropyl (meth)acrylate, isobutyl (meth)acrylate, t-butyl (meth)acrylate, isopentyl (meth)acrylate, amyl (meth)acrylate, neopentyl (meth)acrylate, isohexyl (meth) acrylate, isoheptyl (meth)acrylate, isooctyl (meth)acrylate, 2-ethylhexyl (meth)acrylate, octyl (meth)acrylate, decyl (meth)acrylate, lauryl (meth)acrylate, and stearyl (meth) acrylate; carboxy-substituted alkyl (meth)acrylates such as β-carboxyethyl (meth)acrylate; hydroxy-substituted alkyl (meth)acrylates such as 2-hydroxyethyl (meth)acrylate, 2-hydroxypropyl (meth)acrylate, 3-hydroxypropyl (meth) acrylate, 2-hydroxybutyl (meth)acrylate, 3-hydroxybutyl (meth)acrylate, and 4-hydroxybutyl (meth)acrylate; and alkoxy-substituted alkyl (meth)acrylates such as 2-methoxyethyl (meth)acrylate.

Of these (meth)acrylates, (meth)acrylates having an alkyl group having 2 to 14 carbon atoms (preferably having 2 to 10 carbon atoms and more preferably having 3 to 8 carbon atoms) are preferred.

These (meth)acrylates may be used alone or in combination of two or more thereof.

Examples of the other monomers include (meth)acrylic acid, ethylenically unsaturated nitriles (e.g., acrylonitrile and methacrylonitrile), vinyl ethers (e.g., vinyl methyl ether and vinyl isobutyl ether), vinyl ketones (e.g., vinyl methyl ketone, vinyl ethyl ketone, and vinyl isopropenyl ketone), divinyls (e.g., divinyl adipate), olefins (e.g., ethylene, propylene, and butadiene), thiols (e.g., dodecanethiol), and dicarboxylic acids (e.g., decanediol acrylate).

In the styrene-acrylic resin, the ratio of a styrene relative to all polymerization components may be 60% by mass or more and is preferably 65% by mass or more and 90% by mass or less and more preferably 70% by mass or more and 85% by mass or less.

On the other hand, the ratio of a (meth)acrylate relative to all polymerization components may be 10% by mass or more and 40% by mass or less and is more preferably 10% by mass or more and 35% by mass or less.

The glass transition temperature (Tg) of the styrene-acrylic resin is preferably 45° C. or higher and 80° C. or lower and more preferably 45° C. or higher and 65° C. or lower.

The glass transition temperature is determined from a differential scanning calorimetry (DSC) curve obtained by DSC. More specifically, the glass transition temperature is determined in accordance with the "extrapolated glass transition onset temperature" described in methods for determining a glass transition temperature in "Testing methods for transition temperatures of plastics" in JIS K 7121-1987.

The weight-average molecular weight (Mw) of the styrene-acrylic resin is preferably 5,000 or more and 700,000 or less and more preferably 7,000 or more and 300,000 or less.

The number-average molecular weight (Mn) of the styrene-acrylic resin is preferably 2,000 or more and 100,000 or less.

The molecular weight distribution Mw/Mn of the styrene-acrylic resin is preferably 1.0 or more and 100 or less and more preferably 1.2 or more and 50 or less.

The weight-average molecular weight and the number-average molecular weight are measured by gel permeation chromatography (GPC). The molecular weight measurement by GPC is performed by using a GPC measurement apparatus HLC-8120GPC manufactured by TOSOH Corporation and using a TSKgel SuperHM-M (15 cm) column manufactured by TOSOH Corporation and a tetrahydrofuran (THF) solvent. The weight-average molecular weight and the number-average molecular weight are calculated from the measurement results by using a molecular weight calibration curve prepared with monodispersed polystyrene standard samples.

Polyester Resin

The polyester resin may be, for example, a publicly known amorphous polyester resin. A crystalline polyester resin may be used as the polyester resin in combination with an amorphous polyester resin. The crystalline polyester resin may be used in an amount of 2% by mass or more and 40% by mass or less (preferably 2% by mass or more and 20% by mass or less) relative to the entire binder resins.

The "crystalline" resin means that, in differential scanning calorimetry (DSC), the resin shows a clear endothermic peak instead of a stepwise change in the amount of heat absorbed. Specifically, when the measurement is performed at a heating rate of 10 (° C./min), the half width of the endothermic peak is 10° C. or less.

On the other hand, the "amorphous" resin means that the resin shows a half width exceeding 10° C., shows a stepwise change in the amount of heat absorbed, or does not show a clear endothermic peak.

Amorphous Polyester Resin

The amorphous polyester resin may be, for example, a polycondensate of a polycarboxylic acid and a polyhydric alcohol. The amorphous polyester resin used may be a commercially available product or a synthesized product.

Examples of the polycarboxylic acid include aliphatic dicarboxylic acids (such as oxalic acid, malonic acid, maleic acid, fumaric acid, citraconic acid, itaconic acid, glutaconic acid, succinic acid, alkenyl succinic acids, adipic acid, and sebacic acid), alicyclic dicarboxylic acids (such as cyclohexanedicarboxylic acid), aromatic dicarboxylic acids (such as terephthalic acid, isophthalic acid, phthalic acid, and naphthalenedicarboxylic acid), anhydrides thereof, and lower alkyl (e.g., having 1 to 5 carbon atoms) esters thereof. In particular, the polycarboxylic acid is, for example, preferably an aromatic dicarboxylic acid.

A trivalent or higher polycarboxylic acid having a cross-linked or branched structure may be used as the polycarboxylic acid in combination with a dicarboxylic acid. Examples of the trivalent or higher polycarboxylic acid include trimellitic acid, pyromellitic acid, anhydrides thereof, and lower alkyl (e.g., having 1 to 5 carbon atoms) esters thereof.

These polycarboxylic acids may be used alone or in combination of two or more thereof.

Examples of the polyhydric alcohol include aliphatic diols (such as ethylene glycol, diethylene glycol, triethylene glycol, propylene glycol, butanediol, hexanediol, and neopentyl glycol), alicyclic diols (such as cyclohexanediol, cyclohexanedimethanol, and hydrogenated bisphenol A), and aromatic diols (such as an ethylene oxide adduct of bisphenol A and a propylene oxide adduct of bisphenol A). In particular, the polyhydric alcohol is, for example, preferably an aromatic diol or an alicyclic diol and more preferably an aromatic diol.

A trihydric or higher polyhydric alcohol having a cross-linked or branched structure may be used as the polyhydric alcohol in combination with a diol. Examples of the trihydric or higher polyhydric alcohol include glycerin, trimethylolpropane, and pentaerythritol.

These polyhydric alcohols may be used alone or in combination or two or more thereof.

The glass transition temperature (Tg) of the amorphous polyester resin is preferably 50° C. or higher and 80° C. or lower and more preferably 50° C. or higher and 65° C. or lower.

The glass transition temperature is determined from a differential scanning calorimetry (DSC) curve obtained by DSC. More specifically, the glass transition temperature is determined in accordance with the "extrapolated glass transition onset temperature" described in methods for determining a glass transition temperature in "Testing methods for transition temperatures of plastics" in JIS K 7121-1987.

The weight-average molecular weight (Mw) of the amorphous polyester resin is preferably 5,000 or more and 1,000,000 or less and more preferably 7,000 or more and 500,000 or less.

The number-average molecular weight (Mn) of the amorphous polyester resin is preferably 2,000 or more and 100,000 or less.

The molecular weight distribution Mw/Mn of the amorphous polyester resin is preferably 1.5 or more and 100 or less and more preferably 2 or more and 60 or less.

The weight-average molecular weight and the number-average molecular weight are measured by gel permeation chromatography (GPC). The molecular weight measurement by GPC is performed by using a GPC measurement apparatus HLC-8120GPC manufactured by TOSOH Corporation and using a TSKgel SuperHM-M (15 cm) column manufactured by TOSOH Corporation and a THF solvent. The weight-average molecular weight and the number-average molecular weight are calculated from the measurement results by using a molecular weight calibration curve prepared with monodispersed polystyrene standard samples.

The amorphous polyester resin is obtained by a well-known production method. Specifically, the amorphous polyester resin is obtained by, for example, a method including setting a polymerization temperature to 180° C. or higher and 230° C. or lower, reducing the pressure inside the reaction system, as necessary, and causing the reaction to proceed while water and alcohol generated during condensation are removed.

If raw material monomers are neither dissolved nor compatible with each other at the reaction temperature, a high-boiling point solvent may be added as a solubilizer to dissolve the monomers. In this case, the polycondensation reaction is performed while the solubilizer is distilled off. If a monomer with poor compatibility is present, the monomer with poor compatibility and an acid or an alcohol to be polycondensed with the monomer may be condensed in advance, and the resulting condensed product may then be polycondensed with the remaining main components.

Crystalline Polyester Resin

The crystalline polyester resin may be, for example, a polycondensate of a polycarboxylic acid and a polyhydric alcohol. The crystalline polyester resin used may be a commercially available product or a synthesized product.

In order to facilitate the formation of a crystalline structure, the crystalline polyester resin may be a polycondensate using polymerizable monomers having a linear aliphatic structure rather than using polymerizable monomers having an aromatic structure.

Examples of the polycarboxylic acid include aliphatic dicarboxylic acids (such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (such as dibasic acids, e.g., phthalic acid, isophthalic acid, terephthalic acid, and naphthalene-2,6-dicarboxylic acid), anhydrides thereof, and lower alkyl (e.g., having 1 to 5 carbon atoms) esters thereof.

A trivalent or higher polycarboxylic acid having a cross-linked or branched structure may be used as the polycarboxylic acid in combination with a dicarboxylic acid. Examples of the tricarboxylic acid include aromatic carboxylic acids (such as 1,2,3-benzenetricarboxylic acid, 1,2,4-benzenetricarboxylic acid, and 1,2,4-naphthalene tricarboxylic acid), anhydrides thereof, and lower alkyl (e.g., having 1 to 5 carbon atoms) esters thereof.

A dicarboxylic acid having a sulfonic acid group, and a dicarboxylic acid having an ethylenic double bond may be used as the polycarboxylic acid in combination with any of these dicarboxylic acids.

These polycarboxylic acids may be used alone or in combination of two or more thereof.

The polyhydric alcohol may be, for example, an aliphatic diol (e.g., a linear aliphatic diol having a main chain with 7 to 20 carbon atoms). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. In particular, the aliphatic diol is preferably 1,8-octanediol, 1,9-nonanediol, or 1,10-decanediol.

A trihydric or higher polyhydric alcohol having a cross-linked or branched structure may be used as the polyhydric alcohol in combination with a diol. Examples of the trihydric or higher polyhydric alcohol include glycerin, trimethylolethane, trimethylolpropane, and pentaerythritol.

These polyhydric alcohols may be used alone or in combination of two or more thereof.

In the polyhydric alcohol, the content of the aliphatic diol may be 80% by mole or more and is preferably 90% by mole or more.

The melting temperature of the crystalline polyester resin is preferably 50° C. or higher and 100° C. or lower, more preferably 55° C. or higher and 90° C. or lower, and still more preferably 60° C. or higher and 85° C. or lower.

The melting temperature is determined from a differential scanning calorimetry (DSC) curve obtained by DSC in accordance with the "peak melting temperature" described in methods for determining a melting temperature in "Testing methods for transition temperatures of plastics" in JIS K 7121-1987.

The weight-average molecular weight (Mw) of the crystalline polyester resin is preferably 6,000 or more and 35,000 or less.

The crystalline polyester resin is obtained by, for example, a well-known production method similar to that for the amorphous polyester resin.

Amorphous Resin Having Amorphous Polyester Resin Segment and Styrene-Acrylic Resin Segment (Hereinafter, May be Referred to as "Hybrid Amorphous Resin")

A hybrid amorphous resin is an amorphous resin in which an amorphous polyester resin segment and a styrene-acrylic resin segment are chemically bonded.

Examples of the hybrid amorphous resin include a resin that has a main chain formed of a polyester resin and a side chain formed of a styrene-acrylic resin and chemically bonded to the main chain; a resin that has a main chain formed of a styrene-acrylic resin and a side chain formed of a polyester resin and chemically bonded to the main chain; a resin that has a main chain formed of a polyester resin and a styrene-acrylic resin chemically bonded to each other; and a resin that has a main chain formed of a polyester resin and a styrene-acrylic resin chemically bonded to each other, and at least one side chain selected from a side chain formed of a polyester resin and chemically bonded to the main chain and a side chain formed of a styrene-acrylic resin and chemically bonded to the main chain.

The amorphous polyester resin and the styrene-acrylic resin that constitute the segments are as described above, and the descriptions therefor are omitted.

The total amount of the polyester resin segment and the styrene-acrylic resin segment in the entire hybrid amorphous resin is preferably 80% by mass or more, more preferably 90% by mass or more, still more preferably 95% by mass or more, and even still more preferably 100% by mass.

A ratio of the styrene-acrylic resin segment relative to the total amount of the polyester resin segment and the styrene-acrylic resin segment in the hybrid amorphous resin is preferably 20% by mass or more and 60% by mass or less, more preferably 25% by mass or more and 55% by mass or less, and still more preferably 30% by mass or more and 50% by mass or less.

The hybrid amorphous resin may be produced by any one of the following methods (i) to (iii).

(i) After a polyester resin segment is prepared by condensation polymerization between a polyhydric alcohol and a polycarboxylic acid, a monomer constituting a styrene-acrylic resin segment is addition-polymerized with the polyester resin segment.

(ii) After a styrene-acrylic resin segment is prepared by addition polymerization of an addition polymerizable monomer, a polyhydric alcohol and a polycarboxylic acid are condensation-polymerized.

(iii) Condensation polymerization between a polyhydric alcohol and a polycarboxylic acid and addition polymerization of an addition polymerizable monomer are performed concurrently.

The content of the binder resin is, for example, preferably 40% by mass or more and 95% by mass or less, more preferably 50% by mass or more and 90% by mass or less, and still more preferably 60% by mass or more and 85% by mass or less relative to the total amount of brilliant toner particles.

Brilliant Pigment

The brilliant pigment may be, for example, a pigment that can provide brilliance similar to metallic luster (brilliant pigment). The brilliant pigment may be any pigment having brilliance. Specific examples of the brilliant pigment include metal powders such as aluminum (elemental Al metal), brass, bronze, nickel, stainless steel, and zinc powders; mica coated with titanium oxide, yellow iron oxide, or the like; coated flaky inorganic crystalline matrix, such as barium sulfate, layered silicates, and silicates of layered aluminum; plate-like monocrystalline titanium oxide; basic carbonates; bismuth oxychloride; natural guanine; flaky glass powder; and flaky glass powders subjected to metal deposition.

In particular, from the viewpoint of mirror reflection intensity, among the brilliant pigments, metal powders are preferable. Among the metal powders, an aluminum powder is the most preferable.

The shape of the brilliant pigment according to the present exemplary embodiment is a flat (flaky) shape from the viewpoint that high brilliance is exhibited in a fixed image.

A flat brilliant pigment will now be described.

An average length of the flat brilliant pigment in the long axis direction is preferably 1 μm or more and 30 μm or less, more preferably 3 μm or more and 20 μm or less, and still more preferably 5 μm or more and 15 μm or less.

A ratio (aspect ratio) of an average length of the brilliant pigment in the long axis direction when an average length of the brilliant pigment in the thickness direction is assumed to be 1 is preferably 5 or more and 200 or less, more preferably 10 or more and 100 or less, and still more preferably 30 or more and 70 or less.

The average lengths and the aspect ratio of the brilliant pigment are measured by the following method. A photograph of pigment particles is taken with a scanning electron microscope (S-4800, manufactured by Hitachi High-Technologies Corporation) at a magnification (300 to 100,000 times) at which measurement can be performed. The resulting image of the pigment particles is two-dimensionalized, and the length of each particle in the long axis direction and the length of each particle in the thickness direction are measured in this state to calculate the average length of the brilliant pigment in the long axis direction, the average length of the brilliant pigment in the thickness direction, and the aspect ratio of the brilliant pigment.

The volume-average particle size of the brilliant pigment is preferably 1.0 μm or more and 20.0 μm or less and more preferably 2.0 μm or more and 15.0 μm or less.

When the volume-average particle size of the brilliant pigment is 1.0 μm or more, the resulting image has good brilliance.

When the volume-average particle size of the brilliant pigment is 20.0 μm or less, the resulting toner has good charging characteristics, and transfer unevenness is reduced.

The volume-average particle size of the brilliant pigment is measured as follows.

A cumulative distribution of the volume is plotted from the small size side with respect to the particle size ranges (channels) that are divided on the basis of the particle size distribution measured with a measurement device such as Multisizer II (manufactured by Beckman Coulter Inc.). The particle size at a cumulative frequency of 50% is defined as a volume-average particle size.

The volume-average particle size of a brilliant pigment in toner particles after production may be measured by the following method. The toner is mixed with a solvent that does not dissolve the brilliant pigment but dissolves only a toner resin, and the mixture is stirred. After the toner resin is sufficiently dissolved in the solvent, the brilliant pigment is subjected to solid-liquid separation. The volume-average particle size of the brilliant pigment is measured with the same particle size distribution measurement device as that described above.

The content of the brilliant pigment relative to the total mass of the brilliant toner particles is preferably 1% by mass or more and 70% by mass or less, more preferably 5% by mass or more and 50% by mass or less, and still more preferably 5% by mass or more and 40% by mass or less.

The brilliant toner according to the present exemplary embodiment may contain a colorant and a release agent.

Colorant

The colorant used is a colorant similar to a colorant used in the color toner described later.

When the brilliant toner contains a colorant, the content of the colorant is, for example, 0% by mass or more and 20% by mass or less and more preferably 3.0% by mass or more and 15% by mass or less relative to the total amount of brilliant toner particles.

Release Agent

Examples of the release agent include hydrocarbon wax; natural wax such as carnauba wax, rice wax, and candelilla wax; synthetic or mineral or petroleum wax such as montan wax; and ester wax such as fatty acid esters and montanic acid esters. The release agent is not limited to these.

The melting temperature of the release agent is preferably 50° C. or higher and 110° C. or lower and more preferably 60° C. or higher and 100° C. or lower.

The melting temperature is determined from a differential scanning calorimetry (DSC) curve obtained by DSC in accordance with the "peak melting temperature" described in methods for determining a melting temperature in "Testing methods for transition temperatures of plastics" in JIS K 7121-1987.

The content of the release agent is, for example, 1% by mass or more and 20% by mass or less and more preferably 5% by mass or more and 15% by mass or less relative to the total amount of brilliant toner particles.

Other Additives

Examples of other additives include well-known additives such as magnetic substances, charge control agents, and inorganic powders. These additives are included in the brilliant toner particles as internal additives.

External Additive

The brilliant toner may have an external additive.

An example of the external additive is inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO.SiO_2$, $K_2O\cdot(TiO_2)_n$, $Al_2O_3.2SiO_2$, $CaCO_3$, $MgCO_3$, $BaSO_4$, and $MgSO_4$.

The surfaces of the inorganic particles serving as an external additive may be hydrophobized. The hydrophobization is performed by, for example, dipping inorganic particles in a hydrophobizing agent. Examples of the hydrophobizing agent include, but are not particularly limited to, silane coupling agents, silicone oils, titanate coupling agents, and aluminum coupling agents. These may be used alone or in combination of two or more thereof.

The amount of the hydrophobizing agent is usually, for example, 1 part by mass or more and 10 parts by mass or less relative to 100 parts by mass of the inorganic particles.

Examples of the external additive further include resin particles (particles of resins such as polystyrene, polymethyl methacrylate (PMMA), and melamine resins) and cleaning active agents (e.g., particles of metal salts of higher fatty acids, typified by zinc stearate, and particles of fluorine-based polymers).

The external addition amount of the external additive is, for example, preferably 0.01% by mass or more and 5% by mass or less and more preferably 0.01% by mass or more and 2.0% by mass or less relative to the total mass of the brilliant toner particles.

Color Toner

Next, components included in the color toner according to the present exemplary embodiment will be described.

The color toner according to the present exemplary embodiment contains color toner particles including a binder resin and a colorant other than the brilliant pigment.

Binder Resin

As the binder resin, any of the binder resins used in the brilliant toner can be used.

The content of the binder resin is, for example, preferably 40% by mass or more and 95% by mass or less, more preferably 50% by mass or more and 90% by mass or less, and still more preferably 60% by mass or more and 85% by mass or less relative to the total amount of the color toner particles.

Colorant

Examples of the colorant include various pigments such as carbon black, chrome yellow, hansa yellow, benzidine yellow, threne yellow, quinoline yellow, pigment yellow, permanent orange GTR, pyrazolone orange, vulcan orange, watchung red, permanent red, brilliant carmine 3B, brilliant carmine 6B, dupont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate; and various dyes such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

These colorants may be used alone or in combination of two or more thereof.

A surface-treated colorant may be used as the colorant as necessary. The colorant may be used in combination with a dispersing agent. Two or more colorants may be used in combination.

The content of the colorant is, for example, preferably 1% by mass or more and 30% by mass or less and more preferably 3% by mass or more and 15% by mass or less relative to the total amount of the color toner particles.

Release Agent

The color toner particles may include a release agent.

The release agent used is the same as the release agent used in the brilliant toner particles, and suitable examples of the release agent are also the same as those used in the brilliant toner particles.

Other Additives

The color toner particles may include other additives other than the binder resin, the colorant other than the brilliant pigment, and the release agent.

The other additives are the same as the other additives used in the brilliant toner particles.

Characteristics Etc. Of Color Toner Particles

The color toner particles may each be a toner particle having a single-layer structure or a toner particle having a so-called core-shell structure that includes a core (core particle) and a covering layer (shell layer) covering the core.

Here, the toner particles having the core-shell structure may each include, for example, a core containing a binder resin and a colorant, and as needed, other additives such as a release agent; and a covering layer containing a binder resin.

The volume-average particle size (D50v) of the color toner particles is preferably 5.5 μm or more and 7.5 μm or less, more preferably 5.8 μm or more and 7.2 μm or less, and still more preferably 6.0 μm or more and 7.0 μm or less.

When the volume-average particle size of the color toner particles is within the above numerical range, the pressure applied to the brilliant toner is easily improved during fixing of the toners. Therefore, bleeding of the release agent from the brilliant toner is accelerated. Thus, the amount of release agent left in the resulting image is more easily reduced, and offset during fixing is more easily suppressed. Presumably, this enables formation of a brilliant image having higher glossiness as well as higher brilliance.

Average particle sizes and particle size distribution indices of color toner particles are measured by the same method as that used for the brilliant toner particles.

The average circularity of the color toner particles is preferably 0.94 or more and 1.00 or less, and more preferably 0.95 or more and 0.98 or less.

The average circularity of a color toner particle is determined as (the perimeter of an equivalent circle)/(the perimeter) [(the perimeter of a circle having the same projection area as the particle image)/(the perimeter of the projection image of the particle)]. Specifically, the average circularity is a value measured by the following method.

First, the color toner particles to be analyzed are collected by suction so as to form a flat stream of the particles. Particle images are captured as still images by instant emission of a strobe light. The average circularity is determined by subjecting the particle images to image analysis with a flow particle image analyzer (FPIA-3000, manufactured by SYSMEX CORPORATION). The number of particles sampled for determination of the average circularity is 3,500.

When the color toner contains an external additive, the color toner (developer) to be analyzed is dispersed in water containing a surfactant, and the resulting dispersion liquid is then subjected to ultrasonic treatment to thereby obtain color toner particles from which the external additive has been removed.

External Additive

The color toner may have an external additive.

The external additive used is the same as the external additive used in the brilliant toner, and suitable examples of the external additive are also the same as those used in the brilliant toner.

Relation Between Brilliant Toner and Color Toner

Forms of Binder Resins

In the toner set according to the present exemplary embodiment, the binder resin included in the brilliant toner particles and the binder resin included in the color toner particles are incompatible with each other.

The binder resin included in the brilliant toner particles and the binder resin included in the color toner particles may have different solubility parameters.

When the solubility parameter of the binder resin included in the brilliant toner particles and the solubility parameter of the binder resin included in the color toner particles are different numerical values, the compatibility between the two binder resins is more easily decreased. Therefore, the interface is more easily generated between the brilliant toner and the color toner during fixing of the toners. It is assumed that, consequently, the release agents more easily bleed to an image surface, and a brilliant image having higher glossiness as well as higher brilliance may be formed.

The difference in absolute value of the solubility parameter between the binder resin included in the brilliant toner particles and the binder resin included in the color toner particles is 0.5 or more and 2.0 or less, preferably 0.6 or more and 1.8 or less, more preferably 0.7 or more and 1.6 or less, and still more preferably 0.8 or more and 1.4 or less.

When the difference in solubility parameter between the binder resin included in the brilliant toner particles and the binder resin included in the color toner particles is within the above numerical range, the compatibility between the two binder resins is still more easily decreased. Therefore, the interface is still more easily generated between the brilliant toner and the color toner during fixing of the toners. It is assumed that, consequently, the release agents more easily bleed to an image surface, and a brilliant image having even higher glossiness as well as even higher brilliance may be formed.

Of the brilliant toner particles and the color toner particles, one may include an amorphous polyester resin as the binder resin, and the other may include a styrene-acrylic resin as the binder resin.

When the combination of the types of binder resins included in the brilliant toner particles and the color toner particles is as described above, the difference in solubility parameter between the two binder resins is easily increased. Therefore, the compatibility between the two binder resins is still more easily decreased, and the interface is still more easily generated between the brilliant toner and the color toner during fixing of the toners. In addition, the difference in solubility parameter between each binder resin and the release agent is easily increased, and the compatibility between the binder resin and the release agent is easily decreased. It is assumed that, consequently, the release agents more easily bleed to an image surface, and a brilliant image having even higher glossiness as well as even higher brilliance may be formed.

The brilliant toner particles may include an amorphous polyester resin as the binder resin, and the color toner particles may include a styrene-acrylic resin as the binder resin.

When the combination of the types of binder resins included in the brilliant toner particles and the color toner particles is as described above, a brilliant image having even higher glossiness as well as even higher brilliance may be formed. The reason for this is probably as follows.

A styrene-acrylic resin tends to have a higher hardness than an amorphous polyester resin. Therefore, when the brilliant toner and the color toner are caused to adhere to a recording medium in this order, the pressure applied to the brilliant toner is easily improved during fixing. Therefore, bleeding of the release agent from the brilliant toner is accelerated. Thus, the amount of release agent left in the resulting image is more easily reduced, and offset during fixing is more easily suppressed. Presumably, this enables formation of a brilliant image having higher glossiness as well as higher brilliance.

One of the brilliant toner particles and the color toner particles may include, as an amorphous polyester resin or a styrene-acrylic resin, an amorphous resin having an amorphous polyester resin segment and a styrene-acrylic resin segment (hybrid amorphous resin).

When one of the brilliant toner particles and the color toner particles includes a hybrid amorphous resin, glossiness is still more easily increased in addition to brilliance. The reason for this is probably as follows.

The hybrid amorphous resin acts on the binder resin as a plasticizer during thermal fixing and functions as a fixing aid that contributes to low-temperature fixability. Since the melt viscosity of the toner decreases, the surface becomes flat and smooth easily, and glossiness increases. It is assumed that, since glossiness increases, the orientation of the brilliant pigment is also improved, and brilliance is improved.

Storage Modulus

The color toner may have a higher storage modulus at 120° C. than the brilliant toner.

When the relation between the storage modulus of the brilliant toner and the storage modulus of the color toner is as described above, glossiness as well as brilliance is more easily increased. The reason for this is probably as follows.

When the color toner has a higher storage modulus at 120° C. than the brilliant toner, the color toner tends to have a higher hardness than the brilliant toner. Therefore, when the brilliant toner and the color toner are caused to adhere to a recording medium in this order, the pressure applied to the brilliant toner is easily improved during fixing. Therefore, bleeding of the release agent from the brilliant toner is accelerated. Thus, the amount of release agent left in the resulting image is more easily reduced, and offset during fixing is more easily suppressed. Presumably, this enables formation of a brilliant image having higher glossiness as well as higher brilliance.

The absolute value ($|Es-Ec|$) of the difference between the storage modulus Es of the brilliant toner at 120° C. and the storage modulus Ec of the color toner at 120° C. is preferably 10,000 Pa or more and 20,000 Pa or less, more preferably 12,000 Pa or more and 18,000 Pa or less, and still more preferably 13,000 Pa or more and 16,000 Pa or less.

When the storage moduli of the brilliant toner and the color toner are within the above numerical range, brilliance and glossiness are still more easily increased. The reason for this is probably as follows.

When the storage moduli of the brilliant toner and the color toner are within the above numerical range and the brilliant toner and the color toner are caused to adhere to a recording medium in this order, the pressure applied to the brilliant toner is more easily improved during fixing. Therefore, bleeding of the release agent from the brilliant toner is further accelerated. Thus, the amount of release agent left in the resulting image is more easily reduced, and offset during fixing is more easily suppressed. Presumably, this enables formation of a brilliant image having even higher glossiness as well as even higher brilliance.

Relation Between Solubility Parameter of Binder Resin and Solubility Parameter of Release Agent The brilliant toner particles and the color toner particles may each include a release agent, and the absolute value of the difference in solubility parameter between the release agent included in the brilliant toner particles and the binder resin included in the color toner particles may be larger than the absolute value of the difference in solubility parameter between the release agent included in the brilliant toner particles and the binder resin included in the brilliant toner particles.

When the relation between the solubility parameter of the binder resin and the solubility parameter of the release agent is as described above, glossiness as well as brilliance is more easily increased. The reason for this is probably as follows.

When the absolute value of the difference in solubility parameter between the release agent included in the brilliant toner particles and the binder resin included in the color toner particles is larger than the absolute value of the difference in solubility parameter between the release agent included in the brilliant toner particles and the binder resin included in the brilliant toner particles, the compatibility between the release agent included in the brilliant toner particles and the binder resin included in the color toner particles decreases. Consequently, the release agent included in the brilliant toner particles easily passes through a color toner layer during fixing of the toners. Therefore, the release agent included in the brilliant toner particles more easily moves to the image surface during fixing. Thus, glossiness as well as brilliance is assumed to be more easily increased.

Difference in Particle Size Between Toner Particles

The color toner particles have a smaller volume-average particle size than the brilliant toner particles, and the absolute value of the difference in volume-average particle size between the brilliant toner particles and the color toner particles is preferably 2.7 μm or more and 5.2 μm or less.

The absolute value of the difference in volume-average particle size between the brilliant toner particles and the color toner particles is more preferably 3.0 μm or more and 4.9 μm or less and still more preferably 3.3 μm or more and 4.6 μm or less.

When the relation between the volume-average particle size of the brilliant toner particles and the volume-average particle size of the color toner particles is as described above, the pressure applied to the brilliant toner is more easily improved during fixing of the toners. It is assumed that this enables formation of a brilliant image having even higher glossiness as well as even higher brilliance.

Method for Producing Toner

The brilliant toner and the color toner (hereinafter, may be combined and simply referred to as a "toner") of the present exemplary embodiment may be prepared by producing brilliant toner particles or color toner particles (hereinafter, may be combined and referred to as "toner particles"), and subsequently adding external additives to the toner particles.

The method for producing toner particles is not particularly limited. The toner particles are produced by a publicly known method such as a dry method, e.g., a kneading/pulverizing method or a wet method, e.g., an emulsion aggregation method, a dissolution suspension method, or a suspension polymerization method.

The kneading/pulverizing method is a method in which materials including a colorant are mixed, the materials are then melt-kneaded with a kneader, an extruder, or the like, the resulting melt-kneaded product is coarsely pulverized and then pulverized with a jet-mill or the like, and toner particles having a desired particle size are obtained by using a pneumatic classifier.

Among these methods, the emulsion aggregation method may be used from the viewpoint that the shape and particle size of toner particles are easily controlled, and the toner particle structure such as a core-shell structure is controlled in a wide range. A method for producing toner particles by the emulsion aggregation method will be described in detail below.

The emulsion aggregation method of the present exemplary embodiment includes an emulsifying step of emulsifying raw materials constituting toner particles to form resin particles (emulsified particles) and the like, an aggregation step of forming an aggregate of the resin particles, and a coalescing step of coalescing the aggregate.

Emulsifying Step

A resin particle dispersion liquid may be prepared by applying shear force to a solution that is a mixture of an aqueous medium and a binder resin with a disperser to emulsify the solution, besides the preparation of a resin particle dispersion liquid using a typical polymerization method, such as an emulsion polymerization method, a suspension polymerization method, or a dispersion polymerization method. In this case, the particles may be formed by reducing the viscosity of the resin component under heating. A dispersing agent may be used to stabilize the dispersed resin particles. Furthermore, when the resin is oily and dissolves in a solvent having a relatively low solubility in water, the resin is dissolved in such a solvent and is dispersed in water in the formed of particles along with a dispersing agent or a polymer electrolyte, and the solvent is then evaporated by heating or reducing pressure to thereby prepare the resin particle dispersion liquid.

Examples of the aqueous medium include water, such as distilled water and ion-exchange water; and alcohols. The aqueous medium is preferably water.

Examples of the dispersing agent used in the emulsifying step include water-soluble polymers such as polyvinyl alcohol, methyl cellulose, ethyl cellulose, hydroxyethyl cellulose, carboxymethyl cellulose, sodium polyacrylate, and sodium polymethacrylate; surfactants such as anionic surfactants, e.g., sodium dodecylbenzene sulfonate, sodium octadecyl sulfate, sodium oleate, sodium laurate, and potassium stearate, cationic surfactants, e.g., laurylamine acetate, stearylamine acetate, and lauryl trimethyl ammonium chloride, amphoteric surfactants, e.g., lauryldimethylamine oxide, and nonionic surfactants, e.g., polyoxyethylene alkyl ethers, polyoxyethylene alkylphenyl ethers, and polyoxyethylene alkyl amines; and inorganic salts such as tricalcium phosphate, aluminum hydroxide, calcium sulfate, calcium carbonate, and barium carbonate.

Examples of the disperser used in the preparation of the emulsion include a homogenizer, a homomixer, a pressure kneader, an extruder, and a media disperser. Regarding the size of the resin particles, the average particle size (volume-average particle size) is preferably 1.0 μm or less, more preferably in the range of 60 nm or more and 300 nm or less, and still more preferably in the range of 150 nm or more and 250 nm or less. At a particle size of 60 nm or more, the resin particles tend to be unstable in the dispersion liquid, and thus aggregation of the resin particles easily occurs in some cases. At a particle size of 1.0 μm or less, the particle size distribution of the toner becomes narrow in some cases.

In the preparation of a release agent dispersion liquid, a release agent is dispersed in water along with an ionic surfactant or a polymer electrolyte such as a polymer acid or a polymer base, and the resulting dispersion liquid is then dispersed by using a homogenizer or pressure discharge disperser with which strong shear force is applied while the dispersion liquid is heated to a temperature higher than or equal to the melting temperature of the release agent. Through this process, a release agent dispersion liquid is produced. In the dispersion treatment, an inorganic compound such as polyaluminum chloride may be added to the dispersion liquid. Suitable examples of the inorganic compound include polyaluminum chloride, aluminum sulfate, highly basic polyaluminum chloride (BAC), polyaluminum hydroxide, and aluminum chloride. Of these, for example, polyaluminum chloride and aluminum sulfate are preferable. The release agent dispersion liquid is used in the emulsion aggregation method but may also be used when a toner is produced by the suspension polymerization method.

The dispersion treatment provides the release agent dispersion liquid that contains release agent particles having a volume-average particle size of 1 μm or less. The volume-average particle size of the release agent particles is more preferably 100 nm or more and 500 nm or less.

At a volume-average particle size of 100 nm or more, in general, the release agent component is easily incorporated in the toner, although this is affected by the characteristics of the binder resin used. At a volume-average particle size of 500 nm or less, a good dispersion state of the release agent in the toner is achieved.

A colorant dispersion liquid and a brilliant pigment dispersion liquid may be prepared by any publicly known dispersion method. For example, typical dispersers, such as a rotary shearing homogenizer, a ball mill, sand mill, and DYNO mill that have media, and an Ultimizer may be used without limitation. A colorant is dispersed in water along with an ionic surfactant or a polymer electrolyte such as a polymer acid or a polymer base.

A dispersion liquid of a brilliant pigment coated with a binder resin may be prepared by dispersing or dissolving a brilliant pigment and a binder resin in a solvent to prepare a mixture, and dispersing the mixture in water by phase-inversion emulsification or shear emulsification.

Aggregation Step

In the aggregation step, the resin particle dispersion liquid, the colorant dispersion liquid, the brilliant pigment dispersion liquid, the release agent dispersion liquid, and the like are mixed to prepare a liquid mixture, and the liquid mixture is heated at a temperature lower than or equal to the glass transition temperature of the resin particles to aggregate particles, thus forming aggregated particles. In many cases, the aggregated particles are formed by adjusting the pH of the liquid mixture to be acidic under stirring. The pH is preferably in the range of 2 or more and 7 or less. In this case, use of an aggregating agent is also effective.

The amount of a dispersion liquid of resin particles containing a crystalline resin, the dispersion liquid being used in the aggregation step, is adjusted depending on the case of producing a brilliant toner or the case of producing a color toner to adjust the value of amount QA of heat absorbed/amount QB of heat absorbed. Thus, a toner set according the present exemplary embodiment is obtained.

As the aggregating agent, besides a surfactant having an opposite polarity to the surfactant used as the dispersing agent and an inorganic metal salt, a divalent or higher valent metal complex is suitably used. In particular, use of the metal complex is preferred because the amount of surfactant used can be reduced, and charging characteristics are improved.

In particular, suitable examples of the inorganic metal salt include aluminum salts and polymers thereof. In order to obtain a narrower particle size distribution, a divalent inorganic metal salt is more suitable than a monovalent inorganic metal salt, a trivalent inorganic metal salt is more suitable than a divalent inorganic metal salt, and a tetravalent inorganic metal salt is more suitable than a trivalent inorganic metal salt. When inorganic metal salts having the same valence are compared, the polymer type of an inorganic metal salt polymer is more suitable.

In the present exemplary embodiment, a polymer of a tetravalent inorganic metal salt containing aluminum is preferably used in order to obtain a narrow particle size distribution.

When the aggregated particles have a desired particle size, a resin particle dispersion liquid may be added once again (coating step) to prepare a toner having a structure in which surfaces of core aggregated particles are coated with a resin. This structure is desired from the viewpoint of chargeability and developability because the release agent, the colorant, and the brilliant pigment are less likely to be exposed to the toner surface. In the case of adding the dispersion liquid once again, an aggregating agent may be added, or the pH may be adjusted before the addition of the extra dispersion liquid.

Coalescing Step

In the coalescing step, the pH of the suspension of aggregated particles is increased to 3 or more and 9 or less under stirring conditions based on the aggregation step to stop the progress of aggregation, and heating is performed at a temperature higher than or equal to the glass transition temperature of the resin to coalesce the aggregated particles. When the core aggregated particles are coated with a resin, the resin is also coalesced to cover the core aggregated particles. The heating time may be determined so that the coalescing is performed. The heating may be performed for about 0.5 hours or more and about 10 hours or less.

After coalescing, cooling is performed to obtain coalesced particles. In the cooling step, crystallization may be accelerated by decreasing the cooling rate near the glass transition temperature of the resin (in a range of the glass transition temperature±10° C.), that is, by performing so-called slow cooling.

The coalesced particles obtained by coalescing are formed into toner particles through a solid-liquid separation step such as filtration, and as necessary, a washing step and a drying step.

To the obtained toner particles, for example, inorganic oxides such as silica, titania, and aluminum oxide are added and caused to adhere as external additives for the purpose of, for example, adjusting charging, providing fluidity, and providing charge exchangeability. These may be performed with, for example, a V-blender, a Henschel mixer, or a Loedige mixer and the external additives may be caused to adhere in two or more stages. The amount of external additive added is preferably 0.1 parts by mass or more and 5 parts by mass or less, and more preferably 0.3 parts by mass or more and 2 parts by mass or less relative to 100 parts by mass of the toner particles.

Furthermore, if necessary, coarse particles of the toner may be removed after external addition by using an ultrasonic sieving machine, a vibrating sieving machine, a pneumatic sieving machine, or the like.

Besides the above-described inorganic oxides and the like, other components (particles) such as a charge control agent, an organic particle material, a lubricant, and a polishing agent may be added as external additives.

The charge control agent is not particularly limited, and colorless or pale-colored charge control agents may be used. Examples of the charge control agent include quaternary ammonium salt compounds, nigrosine compounds, complexes of aluminum, iron, chromium, or the like, and triphenylmethane pigments.

Examples of the organic particle material include particles that are commonly used as external additives of toner surfaces, such as vinyl resins, polyester resins, and silicone resins. These inorganic particle materials and organic particle materials are used as, for example, a fluidity aid or a cleaning aid.

Examples of the lubricant include fatty acid amides such as ethylene bis-stearamide and oleamide and fatty acid metal salts such as zinc stearate and calcium stearate.

Examples of the polishing agent include the above-mentioned silica, alumina, and ceric oxide.

Next, a method for producing toner particles by the dissolution suspension method will be described in detail.

The dissolution suspension method is a method in which a material including a binder resin, a brilliant pigment, a color pigment, and other optional components such as a release agent is dissolved or dispersed in a solvent in which the binder resin is soluble to prepare a liquid, the liquid is granulated in an aqueous medium containing an inorganic dispersing agent, and the solvent is then removed to obtain toner particles.

Examples of the other components used in the dissolution suspension method include, in addition to a release agent, various components such as internal additives, a charge control agent, inorganic powders (inorganic particles), and organic particles.

In the present exemplary embodiment, the binder resin, the brilliant pigment, the color pigment, and the other optional components are dissolved or dispersed in a solvent in which the binder resin is soluble.

Whether the binder resin is soluble or not is hard to determine because it depends on, for example, the component, the molecular chain length, and the degree of three-dimensionality of the binder resin. However, in general, the solvents used are hydrocarbons such as toluene, xylene, and hexane; halogenated hydrocarbons such as methylene chloride, chloroform, dichloroethane, and dichloroethylene; alcohols and ethers such as ethanol, butanol, benzyl alcohol ethyl ether, benzyl alcohol isopropyl ether, tetrahydrofuran, and tetrahydropyran; esters such as methyl acetate, ethyl acetate, butyl acetate, and isopropyl acetate; and ketones and acetals such as acetone, methyl ethyl ketone, diisobutyl ketone, dimethyl oxide, diacetone alcohol, cyclohexanone, and methylcyclohexane.

These solvents dissolve the binder resin and need not dissolve the brilliant pigment, the color pigment, and the other components. It is only necessary that the brilliant pigment and the other components can be dispersed in the solution of the binder resin.

The amount of solvent used is not limited as long as the liquid has such a viscosity that granulation can be performed in the aqueous medium. The ratio of the material (the former) including the binder resin, the brilliant pigment, and the other components to the solvent (the latter) is preferably 10/90 to 50/50 (mass ratio of the former/the latter) in view of the ease of granulation and the final yield of toner particles.

The liquid (toner mother liquor) including the binder resin, the brilliant pigment, the color pigment, and the other components dissolved or dispersed in the solvent is granulated in an aqueous medium containing an inorganic dispersing agent such that a predetermined particle size is obtained. Water is often used as the aqueous medium. The mixing ratio of the aqueous medium to the toner mother liquor is preferably aqueous medium/toner mother liquor=90/10 to 50/50 (mass ratio).

The inorganic dispersing agent is preferably selected from tricalcium phosphate, hydroxyapatite, calcium carbonate, titanium oxide, and silica powders.

The amount of inorganic dispersing agent used is determined according to the particle size of particles to be granulated. In general, the inorganic dispersing agent is preferably used in an amount of 0.1% by mass or more and 15% by mass or less based on the toner mother liquor. In an amount of 0.1% by mass or more, granulation tends to be satisfactorily performed. In an amount of 15% by mass or less, unnecessary fine articles are less likely to be generated, and desired particles are easily obtained at a high yield.

In order to satisfactorily perform granulation from the toner mother liquor, an auxiliary agent may be further added to the aqueous medium containing the inorganic dispersing agent.

The auxiliary agent may be a publicly known cationic, anionic, or nonionic surfactant, and in particular, an anionic surfactant is preferred. Examples thereof include sodium alkylbenzene sulfonates, sodium α-olefin sulfonates, and sodium alkyl sulfonates. These auxiliary agents are preferably used in an amount of $1\times10^{-4}$% by mass or more and 0.1% by mass or less based on the toner mother liquor.

The granulation from the toner mother liquor in the aqueous medium containing an inorganic dispersing agent may be performed under shearing.

In this case, the toner mother liquor is desirably granulated such that the average particle size becomes 20 μm or less and is particularly desirably granulated such that the average particle size becomes 3 μm or more and 15 μm or less.

Examples of an apparatus equipped with a shearing mechanism include various dispersers. Among such dispersers, a homogenizer may be used. With a homogenizer, substances that are not compatible with each other (the aqueous medium containing an inorganic dispersing agent and the toner mother liquor in the present exemplary embodiment) are caused to pass through a gap between a casing and a rotary rotor. This enables a substance that is not compatible with a certain liquid to be dispersed in the liquid in the form of particles.

Specific examples of the homogenizer include a TK homomixer, a line-flow homomixer, and an auto-homomixer (all of which are manufactured by Tokushu Kika Kogyo Co., Ltd.), a Silverson homogenizer (manufactured by Silverson), and a Polytron homogenizer (manufactured by KINEMATICA AG).

A stirring condition with a homogenizer may be 2 m/sec or more in terms of peripheral speed of a blade of the rotor. At a peripheral speed of 2 m/sec or more, formation of particles tends to be satisfactorily performed.

After the granulation is performed as described above, the solvent is removed.

The solvent may be removed at ordinary temperature (25° C.) and ordinary pressure. However, since it takes a long time until the solvent is removed, the solvent may be removed under such temperature conditions that the temperature is lower than the boiling point of the solvent and the difference between the temperature and the boiling point is 80° C. or lower. The pressure may be either ordinary pressure or a reduced pressure. If the pressure is reduced, the removal is preferably performed at 20 mmHg or more and 150 mmHg or less.

After the removal of the solvent, toner particles may be washed with, for example, hydrochloric acid. The inorganic dispersing agent remaining on the surfaces of the toner particles is thereby removed, so that the toner particles have the original composition, and the characteristics can be improved.

Subsequently, dehydration and drying are performed to provide powdery toner particles.

The toner according the present exemplary embodiment is produced by, for example, adding an external additive to the dried toner particles obtained above and performing mixing. The mixing may be performed with, for example, a V-blender, a Henschel mixer, or a Loedige mixer. Furthermore, if necessary, coarse particles of the toner may be removed by using a vibrating sieving machine, a pneumatic sieving machine, or the like.

Electrostatic Image Developer Set

An electrostatic image developer set according to the present exemplary embodiment has a first electrostatic image developer including the brilliant toner of the toner set according to present exemplary embodiment, and a second electrostatic image developer including the color toner of the toner set according to present exemplary embodiment.

Each of the electrostatic image developers may be a one-component developer that includes only the toner, or may be a two-component developer that is a mixture of the toner and a carrier.

The carrier is not particularly limited and may be a publicly known carrier. Examples of the carrier include a coated carrier obtained by coating a surface of a core material formed of a magnetic powder with a coating resin; a magnetic powder-dispersed carrier in which a magnetic powder is dispersed and blended in a matrix resin; and a resin-impregnated carrier in which a porous magnetic powder is impregnated with a resin.

The magnetic powder-dispersed carrier and the resin-impregnated carrier may each be a carrier obtained by coating a core material, which is formed of the particles constituting the carrier, with a coating resin.

Examples of the magnetic powder include magnetic metals such as iron, nickel, and cobalt; and magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, vinyl chloride-vinyl acetate copolymers, styrene-acrylic acid copolymers, straight silicone resins containing an organosiloxane bond or modified products thereof, fluororesins, polyesters, polycarbonate, phenol resins, and epoxy resins.

The coating resin and the matrix resin may contain other additives such as conductive particles.

Examples of the conductive particles include particles of metals such as gold, silver, and copper, carbon black, titanium oxide, zinc oxide, tin oxide, barium sulfate, aluminum borate, and potassium titanate.

An example of the method for coating the surface of the core material with the coating resin is a method including coating the surface of the core material with a coating layer-forming solution prepared by dissolving the coating resin and, as necessary, various additives in an appropriate solvent. The solvent is not particularly limited and may be selected in consideration of, for example, the coating resin to be used and application suitability.

Specific examples of the resin coating method include a dipping method including dipping a core material in a coating layer-forming solution, a spraying method including spraying a coating layer-forming solution onto the surface of a core material, a fluidized bed method including spraying a coating layer-forming solution while a core material is floated by a flow of air, and a kneader coater method including mixing a core material of the carrier and a coating layer-forming solution in a kneader coater, and removing the solvent.

A mixing ratio (mass ratio) of the toner and the carrier in the two-component developer is preferably toner:carrier=1:100 to 30:100 and more preferably 3:100 to 20:100.

Image Forming Apparatus and Method for Forming Image

An image forming apparatus and a method for forming an image according to the present exemplary embodiment will be described.

The image forming apparatus according to the present exemplary embodiment includes first image forming means for forming a brilliant image with the brilliant toner of the toner set according to the present exemplary embodiment, second image forming means for forming a color image with the color toner of the toner set according to the present exemplary embodiment, transfer means for transferring the brilliant image and the color image onto a recording medium, and fixing means for fixing the brilliant image and the color image on the recording medium.

The image forming apparatus according to the present exemplary embodiment may include, as each of the first and second image forming means, image forming means that includes an image carrier, charging means for charging a surface of the image carrier, electrostatic image forming means for forming an electrostatic image on the charged surface of the image carrier, and developing means for developing the electrostatic image formed on the surface of the image carrier with an electrostatic image developer to form a toner image.

Alternatively, the image forming apparatus according to the present exemplary embodiment may include an image carrier, charging means for charging a surface of the image carrier, electrostatic image forming means for forming electrostatic images on the charged surface of the image carrier, and, as the first and second image forming means, first and second developing means for developing the electrostatic images formed on the surface of the image carrier with electrostatic image developers to form toner images.

In the image forming apparatus according to the present exemplary embodiment, a method for forming an image (a method for forming an image according to the present exemplary embodiment) is performed. The method includes a first image forming step of forming a brilliant image with the brilliant toner of the toner set according to the present exemplary embodiment, a second image forming step of forming a color image with the color toner of the toner set according to the present exemplary embodiment, a transfer step of transferring the brilliant image and the color image onto a recording medium, and a fixing step of fixing the brilliant image and the color image on the recording medium.

The image forming apparatus according to the present exemplary embodiment may be applied to well-known image forming apparatuses such as a direct transfer-type apparatus that transfers a toner image (a brilliant image or a color image in the present exemplary embodiment) formed on the surface of the image carrier directly onto a recording medium; an intermediate transfer-type apparatus that first-transfers a toner image formed on the surface of the image carrier to the surface of an intermediate transfer body and second-transfers the toner image transferred to the surface of the intermediate transfer body to the surface of a recording medium; an apparatus including cleaning means for cleaning the surface of the image carrier after transfer of the toner image but before charging; and an apparatus including charge erasing means for erasing charges on the surface of the image carrier after transfer of the toner image but before charging by irradiating the surface of the image carrier with charge erasing light.

When the image forming apparatus according to the present exemplary embodiment is the intermediate transfer-type apparatus, the transfer means includes, for example, an intermediate transfer body having a surface to which a toner image is to be transferred, first transfer means for first-transferring a toner image formed on the surface of the image carrier to the surface of the intermediate transfer body, and second transfer means for second-transferring the toner image transferred to the surface of the intermediate transfer body to a surface of a recording medium.

An example of the image forming apparatus according to the present exemplary embodiment will be described below, but the image forming apparatus is not limited thereto. In the following description, major components illustrated in the figure will be described, and a description of other components will be omitted. In the following description, a brilliant toner is referred to as a "silver toner", and an example of the toner set according to the present exemplary embodiment will be described.

Figure 2:
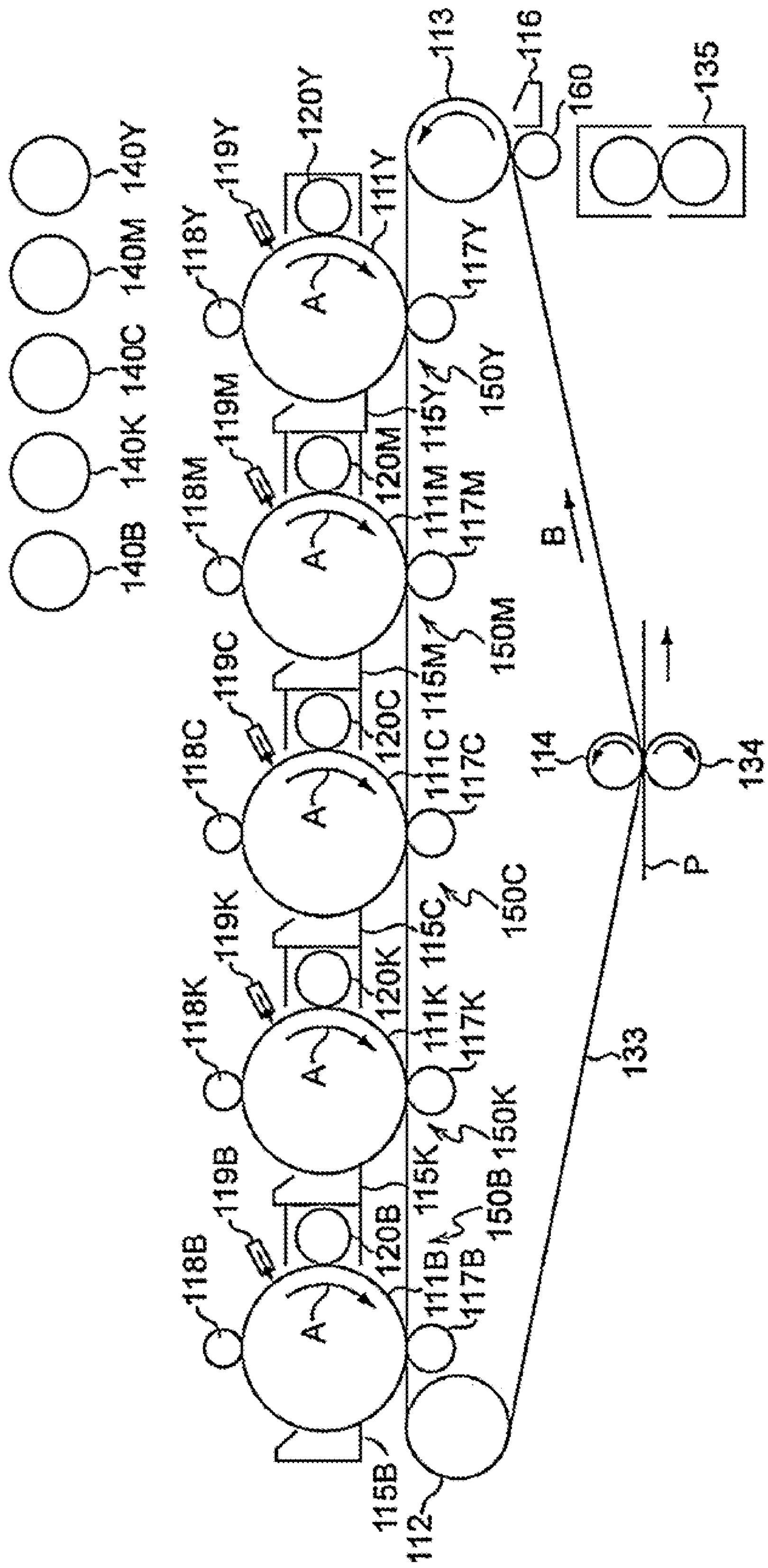
FIG. 2 is a schematic diagram illustrating an example of an image forming apparatus according to an exemplary embodiment.

FIG. 2 is a schematic diagram illustrating the image forming apparatus according to the present exemplary embodiment and is a diagram illustrating a quintuple-tandem intermediate transfer-type image forming apparatus.

The image forming apparatus illustrated in FIG. 2 includes first to fifth electrophotographic image forming units 150Y, 150M, 150C, 150K, and 150B (image forming means) that output yellow (Y), magenta (M), cyan (C), black (K), and silver (B) images, respectively, based on color-separated image data. These image forming units (hereinafter, may be simply referred to as "units") 150Y, 150M, 150C, 150K, and 150B are arranged in a horizontal direction so as to be spaced apart from each other by a predetermined distance. These units 150Y, 150M, 150C, 150K, and 150B may be process cartridges that are attachable to and detachable from the image forming apparatus.

An intermediate transfer belt (an example of the intermediate transfer body) 133 is disposed below the units 150Y, 150M, 150C, 150K, and 150B so as to extend through the units. The intermediate transfer belt 133 is wound around a driving roller 113, a support roller 112, and an opposing roller 114 that are in contact with the inner surface of the intermediate transfer belt 133 and is configured to run in a direction (direction of arrow B in FIG. 2) from the first unit 150Y toward the fifth unit 150B. An intermediate transfer body cleaning device 116 is disposed on the image carrying surface side of the intermediate transfer belt 133 so as to face the driving roller 113. A voltage application device 160 that generates an electric field between the intermediate transfer belt 133 and the voltage application device 160 by generating a potential difference between the driving roller 113 and the voltage application device 160 is disposed upstream of the intermediate transfer body cleaning device 116 in the rotational direction of the intermediate transfer belt 133.

Yellow, magenta, cyan, black, and silver toners contained in toner cartridges 140Y, 140M, 140C, 140K, and 140B, respectively, are supplied to developing devices (examples of the developing means) 120Y, 120M, 120C, 120K, and 120B of the units 150Y, 150M, 150C, 150K, and 150B, respectively.

The first to fifth units 150Y, 150M, 150C, 150K, and 150B have substantially the same configuration, operation, and action. Therefore, the first unit 150Y that forms a yellow image and is disposed upstream in the direction in which the intermediate transfer belt runs will be described here as a representative example.

The first unit 150Y includes a photoreceptor 111Y serving as an image carrier. A charging roller (an example of the charging means) 118Y that charges the surface of the photoreceptor 111Y to a predetermined potential; an exposure device (an example of the electrostatic image forming means) 119Y that exposes the charged surface to a laser beam emitted in accordance with a color-separated image signal to thereby form an electrostatic image; a developing device (an example of the developing means) 120Y that supplies a toner to the electrostatic image to develop the electrostatic image; a first transfer roller (an example of the first transfer means) 117Y that transfers the developed toner image onto the intermediate transfer belt 133; and a photoreceptor cleaning device (an example of the cleaning means) 115Y that removes the toner remaining on the surface of the photoreceptor 111Y after the first transfer are disposed around the photoreceptor 111Y in this order.

The first transfer roller 117Y is disposed on the inner side of the intermediate transfer belt 133 and located at a position facing the photoreceptor 111Y. Bias power supplies (not shown) that apply a first transfer bias are connected to the respective first transfer rollers 117Y, 117M, 117C, 117K, and 117B of the units. Each of the bias power supplies is controlled by a controller (not shown) to change the value of the transfer bias applied to the corresponding first transfer roller.

An operation for forming a yellow image in the first unit 150Y will now be described.

First, prior to the operation, the surface of the photoreceptor 111Y is charged by the charging roller 118Y to a potential of −600 V to −800 V.

The photoreceptor 111Y is produced by forming a photosensitive layer on a conductive substrate (having a volume resistivity of, for example, $1\times10^{-6}$ Ωcm or less at 20° C.). This photosensitive layer has the property that the photosensitive layer usually has a high resistance (the resistance of a typical resin) but when irradiated with a laser beam, the specific resistance of a portion that has been irradiated with the laser beam is changed. Accordingly, the charged surface of the photoreceptor 111Y is irradiated with a laser beam from the exposure device 119Y in accordance with yellow image data sent from a controller (not shown). Consequently, an electrostatic image with a yellow image pattern is formed on the surface of the photoreceptor 111Y.

The electrostatic image is an image formed on the surface of the photoreceptor 111Y by charging and is the so-called negative latent image formed in the following manner. The specific resistance of a portion of the photosensitive layer irradiated with the laser beam from the exposure device 119Y decreases, so that the charges on the irradiated surface of the photoreceptor 111Y flow out, while the charges on a portion that is not irradiated with the laser beam remain.

The electrostatic image formed on the photoreceptor 111Y rotates to a predetermined developing position as the photoreceptor 111Y runs. The electrostatic image on the photoreceptor 111Y at this developing position is then developed and visualized as a toner image by the developing device 120Y.

The developing device 120Y contains, for example, an electrostatic image developer including at least a yellow toner and a carrier. The yellow toner is stirred inside the developing device 120Y and thereby frictionally charged. The charged yellow toner has a charge having the same polarity (negative polarity) as the charge generated on the photoreceptor 111Y and is held on a developer roller (an example of a developer holding member). As the surface of the photoreceptor 111Y passes through the developing device 120Y, the yellow toner electrostatically adheres to charge-erased latent image portions on the surface of the photoreceptor 111Y, and the latent image is thereby developed with the yellow toner. The photoreceptor 111Y on which the yellow toner image is formed continues to run at a predetermined speed, thereby transporting the toner image developed on the photoreceptor 111Y to a predetermined first transfer position.

When the yellow toner image on the photoreceptor 111Y is transported to the first transfer position, a first transfer bias is applied to the first transfer roller 117Y, and electrostatic force directed from the photoreceptor 111Y toward the first transfer roller 117Y acts on the toner image. Thus, the toner image on the photoreceptor 111Y is transferred onto the intermediate transfer belt 133. The transfer bias applied at this time has a (+) polarity opposite to the (−) polarity of the toner and is controlled by the controller (not shown) to, for example, +10 μA in the first unit 150Y.

On the other hand, the toner remaining on the photoreceptor 111Y is removed and collected by the photoreceptor cleaning device 115Y.

The first transfer biases applied to the first transfer rollers 117M, 117C, 117K, and 117B of the second unit 150M and subsequent units are also controlled according to the first unit.

The intermediate transfer belt 133 on which the yellow toner image is transferred in the first unit 150Y is sequentially transported through the second to fifth units 150M, 150C, 150K, and 150B, and toner images of respective colors are transferred on top of each other.

The intermediate transfer belt 133 to which the five color toner images are transferred on top of each other through the first to fifth units reaches a second transfer portion that is composed of the intermediate transfer belt 133, the opposing roller 114 in contact with the inner surface of the intermediate transfer belt 133, and a second transfer roller (an example of the second transfer means) 134 disposed on the image carrying surface side of the intermediate transfer belt 133. A recording sheet (an example of the recording medium) P is supplied to a gap between the second transfer roller 134 and the intermediate transfer belt 133 that are in contact with each other at a predetermined timing through a supply mechanism, and a second transfer bias is applied to the opposing roller 114. The transfer bias applied at this time has the same polarity (−) as the polarity (−) of the toner, and electrostatic force directed from the intermediate transfer belt 133 toward the recording sheet P acts on the toner images. Thus, the toner images on the intermediate transfer belt 133 are transferred onto the recording sheet P. The second transfer bias applied at this time is determined according to a resistance detected by a resistance detector (not shown) that detects the resistance of the second transfer portion and is controlled in terms of voltage.

The recording sheet P is then sent to a pressure contact portion (nip) of a pair of fixing rollers in a fixing device (an example of the fixing means) 135, and the toner images are fixed onto the recording sheet P to thereby form a fixed image.

Examples of the recording sheet P onto which toner images are transferred include plain paper used for, for example, electrophotographic copying machines and printers. Examples of the recording medium include OHP sheets besides the recording sheet P.

In order to further improve the smoothness of the surfaces of images after fixing, the recording sheet P may also have a smooth surface. For example, coat paper produced by coating the surface of plain paper with a resin or the like, and art paper for printing are suitably used.

The recording sheet P to which the color image has been completely fixed is transported toward an ejection portion. Thus, a series of the color image formation operations is completed.

The image forming apparatus illustrated in FIG. 2 is configured so that the toner cartridges 140Y, 140M, 140C, 140K, and 140B are attachable to and detachable from the image forming apparatus. The developing devices 120Y, 120M, 120C, 120K, and 120B are connected to the toner cartridges of corresponding developing devices (colors) with toner supply tubes (not shown) therebetween. When the amount of the remaining toner contained in a toner cartridge becomes small, this toner cartridge is replaced.

Process Cartridge and Toner Cartridge Set

A process cartridge according to the present exemplary embodiment will be described.

The process cartridge according to the present exemplary embodiment includes first developing means that contains the first electrostatic image developer of the electrostatic image developer set according to the present exemplary embodiment, and second developing means that contains the second electrostatic image developer of the electrostatic image developer set according to the present exemplary embodiment, the process cartridge being attachable to and detachable from an image forming apparatus.

The configuration of the process cartridge according to the present exemplary embodiment is not limited to the above one. The process cartridge may include developing devices and, as necessary, for example, at least one selected from other means such as an image carrier, charging means, electrostatic image forming means, and transfer means.

An example of the process cartridge according to the present exemplary embodiment will be described below, but the process cartridge is not limited thereto. Major components illustrated in the figure will be described, and a description of other components will be omitted.

Figure 3:
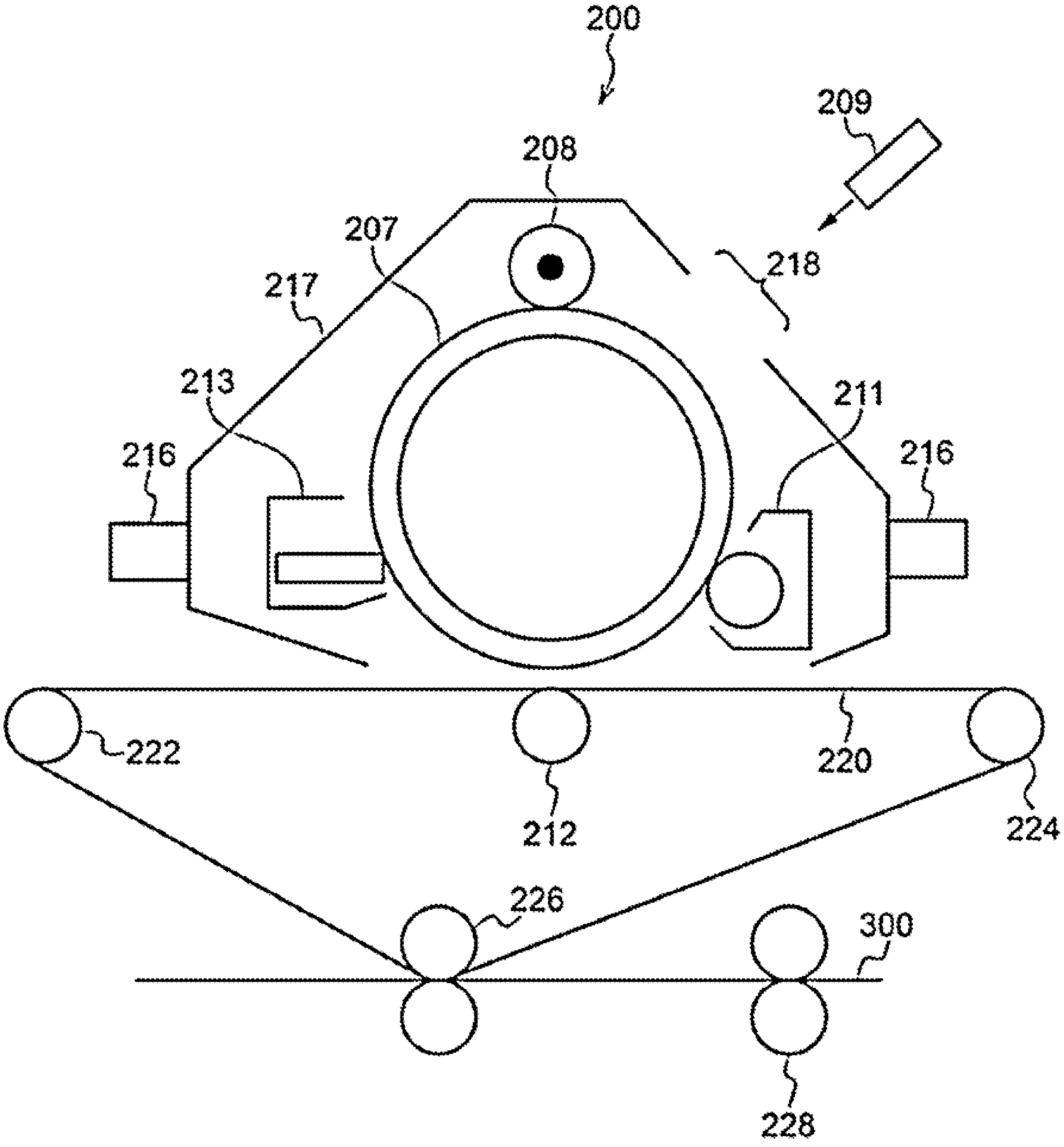
FIG. 3 is a schematic diagram illustrating an example of a process cartridge according to an exemplary embodiment.

FIG. 3 is a schematic diagram illustrating a process cartridge according to the present exemplary embodiment.

A process cartridge 200 illustrated in FIG. 3 includes, for example, a housing 217 having mounting rails 216 and an opening 218 for light exposure and further includes a photoreceptor 207 (an example of the image carrier), and a charging roller 208 (an example of the charging means), a developing device 211 (an example of the developing means), and a photoreceptor cleaning device 213 (an example of the cleaning means) that are disposed around the photoreceptor 207. The housing 217 integrates and holds the photoreceptor 207, the charging roller 208, the developing device 211, and the photoreceptor cleaning device 213 to thereby form a cartridge.

FIG. 3 further illustrates an exposure device (an example of the electrostatic image forming means) 209, a first transfer roller (an example of the first transfer means) 212, an intermediate transfer belt (an example of the intermediate transfer body) 220, a driving roller (an example of intermediate transfer body charge erasing means) 222 also functioning as intermediate transfer belt charge erasing means, a support roller 224, a second transfer roller (an example of the second transfer means) 226, a fixing device (an example of the fixing means) 228, and a recording sheet (an example of the recording medium) 300.

Next, a toner cartridge set according to the present exemplary embodiment will be described.

The toner cartridge set according to the present exemplary embodiment has a first toner cartridge that contains the brilliant toner of the toner set according to the present exemplary embodiment, and a second toner cartridge that contains the color toner of the toner set according to the present exemplary embodiment, the toner cartridge set being attachable to and detachable from an image forming apparatus.

Each of the toner cartridges contains a replenishment toner to be supplied to corresponding developing means disposed in the image forming apparatus.

EXAMPLES

Examples will be described below. However, the present disclosure is not limited to these Examples. In the following description, “parts” and “%” are all based on mass unless otherwise noted.

Preparation of Resin Particle Dispersion Liquids

Preparation Procedure of Amorphous Polyester Resin Particle Dispersion Liquid 1

Synthesis of Amorphous Polyester Resin 1

Dimethyl adipate: 74 parts

Dimethyl terephthalate: 192 parts

Ethylene oxide adduct of bisphenol A: 216 parts

Ethylene glycol: 38 parts

Tetrabutoxy titanate (catalyst): 0.037 parts

The above components are placed in a two-necked flask dried by heating. Nitrogen gas is introduced into the container to maintain an inert atmosphere, the temperature is increased while stirring, and a co-condensation polymerization reaction is then caused to proceed at 160° C. for seven hours. Subsequently, while the pressure is gradually reduced to 10 Torr, the temperature is increased to 220° C. and maintained for four hours. The pressure is once returned to ordinary pressure, 9 parts of trimellitic anhydride is added, and the pressure is again gradually reduced to 10 Torr and maintained at 220° C. for one hour to thereby synthesize an amorphous polyester resin 1.

Preparation of Amorphous Polyester Resin Particle Dispersion Liquid 1

Amorphous polyester resin 1: 160 parts

Ethyl acetate: 233 parts

Aqueous sodium hydroxide solution (0.3 N): 0.1 parts

The above components are placed in a 1,000 mL separable flask, heated at 70° C., and stirred with a Three-One motor (manufactured by Shinto Scientific Co., Ltd.) to prepare a resin mixture solution. While the resin mixture solution is further stirred, 373 parts of ion-exchange water is slowly added thereto to perform phase-inversion emulsification, and the solvent is removed. Thus, an amorphous polyester resin particle dispersion liquid 1 (solid content: 30%) is prepared.

Preparation Procedure of Amorphous Polyester Resin Particle Dispersion Liquid 2

An amorphous polyester resin particle dispersion liquid 2 is prepared by the same procedure as that for the amorphous polyester resin particle dispersion liquid 1 except that, in the synthesis of the amorphous polyester resin 1, 38 parts of propylene glycol is added instead of adding 38 parts of ethylene glycol.

Preparation Procedure of Amorphous Polyester Resin Particle Dispersion Liquid 3

An amorphous polyester resin particle dispersion liquid 3 is prepared by the same procedure as that for the amorphous polyester resin particle dispersion liquid 1 except that, in the synthesis of the amorphous polyester resin 1, 55 parts of propylene glycol is added instead of adding 38 parts of ethylene glycol.

Preparation Procedure of Amorphous Polyester Resin Particle Dispersion Liquid 4

Synthesis of Amorphous Polyester Resin 4

Dimethyl adipate: 104 parts
Dimethyl terephthalate: 257 parts
Ethylene oxide adduct of bisphenol A: 108 parts
Ethylene glycol: 38 parts
Tetrabutoxy titanate (catalyst): 0.037 parts The above components are placed in a two-necked flask dried by heating. Nitrogen gas is introduced into the container to maintain an inert atmosphere, the temperature is increased while stirring, and a co-condensation polymerization reaction is then caused to proceed at 160° C. for seven hours. Subsequently, while the pressure is gradually reduced to 10 Torr, the temperature is increased to 220° C. and maintained for four hours. The pressure is once returned to ordinary pressure, 9 parts of trimellitic anhydride is added, and the pressure is again gradually reduced to 10 Torr and maintained at 220° C. for one hour to thereby synthesize an amorphous polyester resin 4.

Preparation of Amorphous Polyester Resin Particle Dispersion Liquid 4

An amorphous polyester resin particle dispersion liquid 4 is prepared by the same procedure as that for preparing the amorphous polyester resin particle dispersion liquid 1 except that, in the preparation of the amorphous polyester resin particle dispersion liquid 1, 160 parts of the amorphous polyester resin 4 is added instead of adding 160 parts of the amorphous polyester resin 1.

Preparation Procedure of Amorphous Polyester Resin Particle Dispersion Liquid 5

Synthesis of Amorphous Polyester Resin 5

Dimethyl adipate: 116 parts
Dimethyl terephthalate: 272 parts
Ethylene oxide adduct of bisphenol A: 82 parts
Ethylene glycol: 38 parts
Tetrabutoxy titanate (catalyst): 0.037 parts The above components are placed in a two-necked flask dried by heating. Nitrogen gas is introduced into the container to maintain an inert atmosphere, the temperature is increased while stirring, and a co-condensation polymerization reaction is then caused to proceed at 160° C. for seven hours. Subsequently, while the pressure is gradually reduced to 10 Torr, the temperature is increased to 220° C. and maintained for four hours. The pressure is once returned to ordinary pressure, 9 parts of trimellitic anhydride is added, and the pressure is again gradually reduced to 10 Torr and maintained at 220° C. for one hour to thereby synthesize an amorphous polyester resin 5.

Preparation of Amorphous Polyester Resin Particle Dispersion Liquid 5

An amorphous polyester resin particle dispersion liquid 5 is prepared by the same procedure as that for preparing the amorphous polyester resin particle dispersion liquid 1 except that, in the preparation of the amorphous polyester resin particle dispersion liquid 1, 160 parts of the amorphous polyester resin 5 is added instead of adding 160 parts of the amorphous polyester resin 1.

Preparation Procedure of Crystalline Polyester Resin Particle Dispersion Liquid

Synthesis of Crystalline Polyester Resin 1,10-Decanedicarboxylic acid: 50% by mole
1,9-Nonanediol: 50% by mole In a reaction container equipped with a stirrer, a thermometer, a condenser, and a nitrogen gas inlet tube, the above monomer components are placed, the reaction container is purged with dry nitrogen gas, and 0.25 parts of titanium tetrabutoxide (reagent) relative to 100 parts of the monomer components is then added. After the reaction mixture is caused to react under stirring at 170° C. for three hours in a nitrogen gas stream, the temperature is further increased to 210° C. over a period of one hour, the pressure in the reaction container is reduced to 3 kPa, and the reaction mixture is caused to react for 13 hours under the reduced pressure to produce a crystalline polyester resin.

Preparation of Crystalline Polyester Resin Particle Dispersion Liquid

In a 3 liter jacketed reaction vessel (BJ-30N, manufactured by Tokyo Rikakikai Co., Ltd.) equipped with a condenser, a thermometer, a water dropping device, and an anchor wing, 300 parts of the crystalline polyester resin, 160 parts of methyl ethyl ketone (solvent), and 100 parts of isopropyl alcohol (solvent) are placed, and the resin is dissolved under mixing and stirring at 100 rpm while the reaction vessel is maintained at 70° C. in a water-circulating constant-temperature bath.

The rotational speed of stirring is then changed to 150 rpm, the water-circulating constant-temperature bath is set to 66° C., and 17 parts of a 10% aqueous ammonia solution (reagent) is added over a period of 10 minutes. Subsequently, a total of 900 parts of ion-exchange water whose temperature is kept at 66° C. is added dropwise at a rate of 7 parts/minute to cause phase inversion. Thus, an emulsion is obtained.

Immediately, 800 parts of the resulting emulsion and 700 parts of ion-exchange water are placed in a 2 liter recovery flask. The recovery flask is then set to an evaporator (Tokyo Rikakikai Co., Ltd.) provided with a vacuum control unit with a bump trap therebetween. The recovery flask is heated in a hot water bath at 60° C. while being rotated, and the solvent is removed by reducing the pressure to 7 kPa with care being taken to prevent bumping. When the amount of the solvent recovered becomes 1,100 parts, the pressure is returned to ordinary pressure, and the recovery flask is cooled with water to obtain a dispersion liquid. The obtained dispersion liquid has no solvent odor. The volume-average particle size D50v of resin particles in the dispersion liquid is 130 nm. Ion exchange-water is then added such that the solid content becomes 20% by mass, and the resulting dispersion liquid is used as a crystalline polyester resin particle dispersion liquid.

Preparation of Styrene-Acrylic Resin Particle Dispersion Liquid 1

Styrene: 320 parts by mass
n-Butyl acrylate: 80 parts by mass
Acrylic acid: 12 parts by mass
10-Dodecanethiol: 2 parts by mass The above components are mixed and dissolved, the resulting solution is dispersed and emulsified in a solution in a flask, the solution being prepared by dissolving 6 parts by mass of a nonionic surfactant (Nonipol 400, manufactured by Sanyo Chemical Industries, Ltd.) and 10 parts by mass of an anionic surfactant (NEOGEN SC, manufactured by DKS Co., Ltd.) in 550 parts by mass of ion-exchange water. While the resulting liquid is slowly mixed for 10 minutes, 50 parts by mass of ion-exchange water containing 4 parts by mass of ammonium persulfate dissolved therein is added to the liquid. After nitrogen purging, the flask is heated under stirring in an oil bath until the temperature of the contents becomes 70° C., and emulsion polymerization is continued for five hours. Subsequently, the solid content is adjusted to 30% to obtain a resin particle dispersion liquid in which styrene-acrylic resin particles are dispersed.

Preparation of Styrene-Acrylic Resin Particle Dispersion Liquid 2

A styrene-acrylic resin particle dispersion liquid 2 (solid content: 30%) is obtained by the same procedure as that for preparing the styrene-acrylic resin particle dispersion liquid 1 except that the amount of 10-dodecanethiol added in the preparation of the styrene-acrylic resin particle dispersion liquid 1 is changed from 2 parts by mass to 1 part by mass.

Preparation of Styrene-Acrylic Resin Particle Dispersion Liquid 3

A styrene-acrylic resin particle dispersion liquid 3 (solid content: 30%) is obtained by the same procedure as that for preparing the styrene-acrylic resin particle dispersion liquid 1 except that the amount of 10-dodecanethiol added in the preparation of the styrene-acrylic resin particle dispersion liquid 1 is changed from 2 parts by mass to 0.5 parts by mass.

Preparation of Hybrid Resin (Amorphous Resin Having Amorphous Polyester Resin Segment and Styrene-Acrylic Resin Segment) Particle Dispersion Liquid (SPE1)

A four-necked flask equipped with a nitrogen inlet tube, a dehydration tube, a stirrer, and a thermocouple is purged with nitrogen and charged with 5,670 parts of polyoxypropylene(2.2)-2,2-bis(4-hydroxyphenyl)propane, 585 parts of polyoxyethylene(2.0)-2,2-bis(4-hydroxyphenyl)propane, 2,450 parts of terephthalic acid, and 44 parts of tin(II) di(2-ethylhexanoate). The flask is heated to 235° C. in a nitrogen atmosphere under stirring and maintained for five hours, the pressure in the flask is then reduced, and the flask is maintained at 8.0 kPa for one hour. After the pressure is returned to the atmospheric pressure, the flask is cooled to 190° C., and 42 parts of fumaric acid and 207 parts of trimellitic acid are added. The flask is maintained at a temperature of 190° C. for two hours and then heated to 210° C. over a period of two hours. Furthermore, the pressure in the flask is reduced, and the flask is maintained at 8.0 kPa for four hours to obtain an amorphous polyester resin A (polyester segment).

Next, a four-necked flask equipped with a condenser tube, a stirring device, and a thermocouple is charged with 800 parts of the amorphous polyester resin A, and stirring is performed at a stirring speed of 200 rpm in a nitrogen atmosphere. Subsequently, as addition-polymerizable monomers, 40 parts of styrene, 142 parts of ethyl acrylate, 16 parts of acrylic acid, and 2 parts of 1,10-decanediol diacrylate, and 1,000 parts of toluene are added, and the resulting mixture is further mixed for 30 minutes.

Furthermore, 6 parts of a polyoxyethylene alkyl ether (nonionic surfactant, trade name: EMULGEN 430, manufactured by Kao Corporation), 40 parts of a 15% aqueous solution of sodium dodecylbenzene sulfonate (anionic surfactant, trade name: NEOPELEX G-15, manufactured by Kao Corporation), and 233 parts of 5% potassium hydroxide are added, and the contents in the flask are, under stirring, heated to 95° C. and melted, and mixed at 95° C. for two hours. Thus, a resin mixture solution is prepared.

Next, while the resin mixture solution is stirred, 1,145 parts of deionized water is added dropwise to the resin mixture solution at a rate of 6 parts/minute to obtain an emulsion. The obtained emulsion is then cooled to 25° C. and passed through a 200-mesh metal screen. Deionized water is added to the emulsion to adjust the solid content to 30%. Thus, a hybrid resin particle dispersion liquid (SPE1) is obtained.

The content of the structural unit derived from styrene in the synthesized hybrid resin is 4% by mass based on the total mass of the hybrid resin.

Preparation Procedure of Colorant Dispersion Liquid Preparation of Brilliant Pigment Dispersion Liquid 1

Aluminum pigment (2173EA 6 μm, manufactured by Showa Aluminum Powder K.K.): 100 parts Anionic surfactant (NEOGEN R, manufactured by DKS Co., Ltd.): 1.5 parts Ion-exchange water: 400 parts A solvent is removed from a paste of the aluminum pigment, and the pigment is mechanically pulverized to 5.2 μm with STARMILL (LMZ, manufactured by Ashizawa Finetech Ltd.) and classified. The pigment is then mixed with the surfactant and ion-exchange water and dispersed by using an emulsification disperser CAVITRON (CR 1010, manufactured by Pacific Machinery & Engineering Co., Ltd.) for about one hour to prepare a brilliant pigment dispersion liquid 1 (solid content: 20% by mass) in which the brilliant pigment particles (aluminum pigment) are dispersed. The pigment dispersion size is 5.2 μm.

Preparation of Cyan Colorant Dispersion Liquid

C.I. Pigment Blue 15:3 (copper phthalocyanine) (manufactured by Dainichiseika Color & Chemicals Mfg. Co., Ltd.): 50 parts Ionic surfactant (NEOGEN RK, manufactured by DKS Co., Ltd.): 5 parts Ion-exchange water: 192.9 parts The above components are mixed and treated with an Ultimizer (manufactured by Sugino Machine Limited) at 240 MPa for 10 minutes to prepare a cyan colorant dispersion liquid. The dispersion liquid has a solid content of 20% by mass.

Preparation Procedure of Release Agent Dispersion Liquid Preparation of Release Agent Dispersion Liquid Carnauba wax (RC-160, manufactured by TOA KASEI CO., LTD.): 50 parts Anionic surfactant (NEOGEN RK, manufactured by DKS Co., Ltd.): 1.0 part Ion-exchange water: 200 parts The above components are mixed, heated to 95° C., dispersed in a homogenizer (ULTRA-TURRAX T50 manufactured by IKA), and then subjected to dispersion treatment in a Manton-Gaulin high-pressure homogenizer (manufactured by Gaulin Corporation) for 360 minutes to prepare a release agent dispersion liquid (solid content: 20% by mass) in which release agent particles having a volume-average particle size of 0.23 μm are dispersed.

Production Procedure of Brilliant Toner Production of Brilliant Toner 1

Brilliant pigment dispersion liquid 1: 150 parts

Styrene-acrylic resin particle dispersion liquid 1: 280 parts

Crystalline polyester resin particle dispersion liquid: 70.0 parts

Release agent dispersion liquid: 75 parts

The above components are placed in a 2 L cylindrical stainless steel container, and dispersed and mixed for 10 minutes while shear force is applied at 4,000 rpm by a homogenizer (ULTRA-TURRAX T50, manufactured by IKA). Subsequently, 1.75 parts of a 10% aqueous nitric acid solution of polyaluminum chloride serving as an aggregating agent is gradually added dropwise thereto. The rotational speed of the homogenizer is set to 5,000 rpm, and the resulting mixture is dispersed and mixed for 15 minutes to obtain a raw material dispersion liquid.

Subsequently, the raw material dispersion liquid is transferred to a polymerization vessel equipped with a thermometer and a stirring device that uses a four-paddle stirring blade. The polymerization vessel is started to be heated in a heating mantle under stirring at a rotational speed of 1,000 rpm, and growth of aggregated particles is accelerated at 54° C. During this process, the pH of the dispersion liquid is controlled in the range of 2.2 to 3.5 by using 0.3 mol/L nitric acid or a 1 mol/L aqueous sodium hydroxide solution. The dispersion liquid is maintained within the pH range described above for about two hours to form aggregated particles.

Next, 70 parts of the styrene-acrylic resin particle dispersion liquid 1 is additionally added thereto to cause styrene-acrylic resin particles to adhere to the surfaces of the aggregated particles. The temperature is further increased to 56° C., and the aggregated particles are adjusted while the size and morphology of the particles are checked with an optical microscope and Multisizer II. Subsequently, 3.25 parts of a chelating agent (HIDS, manufactured by NIPPON SHOKUBAI CO., LTD.) is added thereto, the pH is then adjusted to 7.8 by using a 5% aqueous sodium hydroxide solution, and the resulting dispersion liquid is maintained for 15 minutes. Subsequently, the pH is raised to 8.0 to coalesce the aggregated particles, and the temperature is then increased to 67.5° C. After the coalescence of the aggregated particles is confirmed with an optical microscope, the pH is decreased to 6.0 while the temperature is maintained at 67.5° C., heating is stopped after one hour, and cooling is performed at a rate of temperature decrease of 1.0° C./minute. Subsequently, the resulting coalesced particles are screened with a 40 μm mesh, repeatedly washed with water, and then dried in a vacuum drier to obtain toner particles. The volume-average particle size of the obtained toner particles is 10.2 μm.

Subsequently, 1.5 parts of colloidal silica (R972, manufactured by Nippon Aerosil Co., Ltd.) is added relative to 100 parts of the obtained toner particles, and mixing is performed with a Henschel mixer at a peripheral speed of 30 m/s for two minutes to obtain a brilliant toner 1.

Production of Brilliant Toner 2

A brilliant toner 2 is obtained by the same procedure as that used for the brilliant toner 1 except that the resin particle dispersion liquid used in the production of toner particles is changed from the styrene-acrylic resin particle dispersion liquid 1 to the amorphous polyester resin particle dispersion liquid 1.

Production of Brilliant Toner 3

A brilliant toner 3 is obtained by the same procedure as that used for the brilliant toner 2 except that the amorphous polyester resin particle dispersion liquid 1 is changed to the amorphous polyester resin particle dispersion liquid 4.

Production of Brilliant Toner 4

A brilliant toner 4 is obtained by the same procedure as that used for the brilliant toner 2 except that the amorphous polyester resin particle dispersion liquid 1 is changed to the amorphous polyester resin particle dispersion liquid 5.

Production of Brilliant Toner 5

A brilliant toner 5 is obtained by the same procedure as that used for the brilliant toner 2 except that the particle size of toner particles is controlled to the value shown in Table 1.

Production of Brilliant Toner 6

A brilliant toner 6 is obtained by the same procedure as that used for the brilliant toner 2 except that the particle size of toner particles is controlled to the value shown in Table 1.

Production of Brilliant Toner 7

A brilliant toner 7 is obtained by the same procedure as that used for the brilliant toner 2 except that the particle size of toner particles is controlled to the value shown in Table 1.

Production of Brilliant Toner 8

A brilliant toner 8 is obtained by the same procedure as that used for the brilliant toner 2 except that the particle size of toner particles is controlled to the value shown in Table 1.

Production of Brilliant Toner 9

A brilliant toner 9 is obtained by the same procedure as that used for the brilliant toner 2 except that the amount of the crystalline polyester resin particle dispersion liquid added is changed from 70 parts by mass to 10 parts by mass.

Production of Brilliant Toner 10

A brilliant toner 10 is obtained by the same procedure as that used for the brilliant toner 2 except that the amount of the crystalline polyester resin particle dispersion liquid added is changed from 70 parts by mass to 20 parts by mass.

Production Procedure of Color Toner

Production of Cyan Toner 1

Cyan colorant dispersion liquid: 37.5 parts

Amorphous polyester resin particle dispersion liquid 1: 330 parts

Crystalline polyester resin particle dispersion liquid: 37.5 parts

Release agent dispersion liquid: 75 parts

The above components are placed in a 2 L cylindrical stainless steel container, and dispersed and mixed for 10 minutes while shear force is applied at 4,000 rpm by a homogenizer (ULTRA-TURRAX T50, manufactured by IKA). Subsequently, 1.75 parts of a 10% aqueous nitric acid solution of polyaluminum chloride serving as an aggregating agent is gradually added dropwise thereto. The rotational speed of the homogenizer is set to 5,000 rpm, and the resulting mixture is dispersed and mixed for 15 minutes to obtain a raw material dispersion liquid.

Subsequently, the raw material dispersion liquid is transferred to a polymerization vessel equipped with a thermometer and a stirring device that uses a four-paddle stirring blade. The polymerization vessel is started to be heated in a heating mantle under stirring at a rotational speed of 600 rpm, and growth of aggregated particles is accelerated at 50° C. During this process, the pH of the dispersion liquid is controlled in the range of 2.2 to 3.5 by using 0.3 mol/L nitric acid or a 1 mol/L aqueous sodium hydroxide solution. The dispersion liquid is maintained within the pH range described above for about two hours to form aggregated particles.

Next, 70 parts of the amorphous polyester resin particle dispersion liquid 1 is additionally added thereto to cause amorphous polyester resin particles to adhere to the surfaces of the aggregated particles. The temperature is further increased to 52° C., and the aggregated particles are adjusted while the size and morphology of the particles are checked with an optical microscope and Multisizer II. Subsequently, 2.25 parts of a chelating agent (HIDS, manufactured by NIPPON SHOKUBAI CO., LTD.) is added thereto, the pH is then adjusted to 7.8 by using a 5 mass % aqueous sodium hydroxide solution, and the resulting dispersion liquid is maintained for 15 minutes. Subsequently, the pH is raised to 8.0 to coalesce the aggregated particles, and the temperature is then increased to 67.5° C. After the coalescence of the aggregated particles is confirmed with an optical microscope, the pH is decreased to 6.0 while the temperature is maintained at 67.5° C., heating is stopped after one hour, and cooling is performed at a rate of temperature decrease of 1.0° C./minute. Subsequently, the coalesced particles are screened with a 20 μm mesh, repeatedly washed with water, and then dried in a vacuum drier to obtain toner particles. The volume-average particle size of the obtained toner particles is 6.4 μm.

Subsequently, 1.5 parts of colloidal silica (R972, manufactured by Nippon Aerosil Co., Ltd.) is added relative to 100 parts of the obtained toner particles, and mixing is performed with a Henschel mixer at a peripheral speed of 30 m/s for two minutes to obtain a cyan toner 1.

Production of Cyan Toner 2

A cyan toner 2 is obtained by the same procedure as that used for the cyan toner 1 except that the resin particle dispersion liquids used in the production of toner particles are changed to the styrene-acrylic resin particle dispersion liquid 1.

As a resin particle dispersion liquid added at the time of charging of the raw materials in the production of the cyan toner 2, 1367.5 parts of the styrene-acrylic resin particle dispersion liquid is added in the production of the cyan toner 2 instead of adding 330 parts of the amorphous polyester resin particle dispersion liquid 1 and 37.5 parts of the crystalline polyester resin particle dispersion liquid in the production of the cyan toner 1.

Production of Cyan Toner 3

A cyan toner 3 is obtained by the same procedure as that used for the cyan toner 1 except that the amorphous polyester resin particle dispersion liquid 1 is changed to the amorphous polyester resin particle dispersion liquid 2.

Production of Cyan Toner 4

A cyan toner 4 is obtained by the same procedure as that used for the cyan toner 1 except that the amorphous polyester resin particle dispersion liquid 1 is changed to the amorphous polyester resin particle dispersion liquid 3.

Production of Cyan Toner 5

A cyan toner 5 is obtained by the same procedure as that used for the cyan toner 2 except that, in the production of the cyan toner 2, the styrene-acrylic resin particle dispersion liquid 1 is changed to the hybrid resin particle dispersion liquid (SPE1).

Production of Cyan Toner 6

A cyan toner 6 is obtained by the same procedure as that used for the cyan toner 2 except that the particle size of toner particles is controlled to the value shown in Table 1.

Production of Cyan Toner 7

A cyan toner 7 is obtained by the same procedure as that used for the cyan toner 2 except that the particle size of toner particles is controlled to the value shown in Table 1.

Production of Cyan Toner 8

A cyan toner 8 is obtained by the same procedure as that used for the cyan toner 2 except that the particle size of toner particles is controlled to the value shown in Table 1.

Production of Cyan Toner 9

A cyan toner 9 is obtained by the same procedure as that used for the cyan toner 2 except that the particle size of toner particles is controlled to the value shown in Table 1.

Production of Cyan Toner 10

A cyan toner 10 is obtained by the same procedure as that used for the cyan toner 2 except that the styrene-acrylic resin particle dispersion liquid 1 is changed to the styrene-acrylic resin particle dispersion liquid 2.

Production of Cyan Toner 11

A cyan toner 11 is obtained by the same procedure as that used for the cyan toner 2 except that the styrene-acrylic resin particle dispersion liquid 1 is changed to the styrene-acrylic resin particle dispersion liquid 3.

Production of Carrier

- Ferrite particles (volume-average particle size: 35 μm): 100 parts
- Toluene: 14 parts
- Perfluorooctyl ethyl acrylate-methyl methacrylate copolymer (critical surface tension: 24 dyn/cm, copolymerization ratio 2:8, weight-average molecular weight: 77,000): 1.6 parts
- Carbon black (trade name: VXC-72, manufactured by Cabot Corporation, volume resistivity: 100 Ωcm or less): 0.12 parts
- Cross-linked melamine resin particles (average particle size: 0.3 μm, insoluble in toluene): 0.3 parts First, the carbon black is diluted with toluene and is added to the perfluorooctyl ethyl acrylate-methyl methacrylate copolymer, and the mixture is dispersed with a sand mill. Next, the above components other than the ferrite particles are dispersed with a stirrer for 10 minutes to prepare a coating layer-forming liquid. The coating layer-forming liquid and the ferrite particles are then placed in a vacuum degassing kneader, the resulting mixture is stirred at a temperature of 60° C. for 30 minutes, and the toluene is then distilled off under reduced pressure to form a resin coating layer. Thus, a carrier is produced.

Preparation of Developer

With regard to each brilliant toner and each cyan toner, 36 parts of the toner and 414 parts of the carrier are placed in a V-blender and stirred for 20 minutes. The resulting mixture is then sieved through a 212 μm sieve to prepare a developer.

Examples 1 to 18 and Comparative Examples 1 to 3

Toner sets are obtained by combining the brilliant toners (brilliant developers) and the color toners (color developers) described in Table 1 below.

Evaluation of Brilliance

A developing device of Color 1000 Press manufactured by Fuji Xerox Co., Ltd. is filled with a developer. A solid image (metallic image portion with a color) with a brilliant toner application amount of 5 g/m$^2$ and a color toner application amount of 3 g/m$^2$ is formed on coated paper (OK TopKote+ paper, surface roughness Rz=1.98 μm, manufactured by Oji Paper Co., Ltd.) at a fixing temperature of 180° C. (pressure roller temperature: 100° C.).

The image is continuously printed on 100 sheets, and the hundredth printed matter is used for the evaluations described below.

The brilliant toner and the color toner included in the developers used in each of the Examples and Comparative Examples are shown in Table 1. In Table 3, numerical values in the column of the amount of crystalline resin each represent the content of the crystalline resin relative to the total mass of toner particles.

A light beam is applied from a direction inclined at an angle of 45° with respect to a direction perpendicular to the surface of the solid image by using a three-dimensional variable angle spectral color-difference meter DDS5000 (manufactured by Nippon Denshoku Industries Co., Ltd.) to measure a lightness index L*45° determined by receiving the light in the direction perpendicular to the surface of the solid image, a lightness index L*15° determined by receiving the light in a direction inclined at an angle of −30° with respect to the direction perpendicular to the surface of the solid image, and a lightness index L*110° determined by receiving the light in a direction inclined at an angle of −65° with respect to the direction perpendicular to the surface of the solid image. The flop index (FI) is calculated by substituting the lightness indices in the following formula. The brilliance is evaluated on the basis of the obtained value in accordance with the following criteria.

$$FI=2.69\times\{(L^*15°)-(L^*110°)1.11\}/(L^*45°)0.86 \quad \text{Formula:}$$

Evaluation Criteria

A: The flop index is 12.5 or more.

B: The flop index is 10.0 or more and less than 12.5.

C: The flop index is 5.0 or more and less than 10.0, which is at an acceptable level in terms of practical use.

D: The flop index is 0 or more and less than 5.0.

Evaluation of Gloss

The glossiness (gloss) of the metallic image portion with a color, the metallic image portion being output on the coated paper in the evaluation of brilliance, is measured with a micro-gloss 60° gloss meter (manufactured by BYK-Gardner Inc.) at an incident light angle on the image of 60 degrees. The gloss is measured at five positions, namely, both ends of a 1-cm leading end portion of the image, a central portion of the image, and both ends of a 1-cm trailing end portion of the image. The average of the values of the gloss measured at the five positions is determined, and the gloss is evaluated in accordance with the following evaluation criteria.

Evaluation Criteria

A: The average of the gloss is 60 or more.

B: The average of the gloss is 50 or more and less than 60.

C: The average of the gloss is 40 or more and less than 50, which is at an acceptable level in terms of practical use.

D: The average of the gloss is 30 or more and less than 40.

TABLE 1

| | Brilliant toner | | | | | Color toner | | | | |
|---|---|---|---|---|---|---|---|---|---|---|
| | | Particle | | Binder resin | | | Particle | | Binder resin | |
| | Type | size of toner particles | Es | Type of resin | SP value A | Type | size of toner particles | Ec | Type of resin | SP value B |
| Example 1 | 1 | 10.2 | 21126 | Styrene-acrylic | 9.2 | 1 | 6.4 | 4359 | Amorphous PE + Crystalline PE | 10.6 |
| Example 2 | 2 | 10.1 | 2145 | Amorphous PE | 10.6 | 2 | 6.5 | 18751 | Styrene-acrylic | 9.2 |
| Com. Ex. 1 | 1 | 10.2 | 21126 | Styrene-acrylic | 9.2 | 2 | 6.5 | 18751 | Styrene-acrylic | 9.2 |
| Com. Ex. 2 | 2 | 10.1 | 2145 | Amorphous PE | 10.6 | 1 | 6.4 | 4359 | Amorphous PE + Crystalline PE | 10.6 |
| Com. Ex. 3 | 2 | 10.1 | 2145 | Amorphous PE | 10.6 | 3 | 6.6 | 4586 | Amorphous PE + Crystalline PE | 10.2 |
| Example 3 | 2 | 10.1 | 2145 | Amorphous PE | 10.6 | 4 | 6.5 | 4985 | Amorphous PE + Crystalline PE | 10.1 |
| Example 4 | 3 | 10.0 | 3587 | Amorphous PE | 11.2 | 1 | 6.5 | 18751 | Styrene-acrylic | 9.2 |
| Example 5 | 4 | 10.2 | 3985 | Amorphous PE | 11.3 | 1 | 6.5 | 18751 | Styrene-acrylic | 9.2 |
| Example 6 | 2 | 10.1 | 2145 | Amorphous PE | 10.6 | 5 | 6.4 | 18500 | Hybrid amorphous resin | 10.1 |
| Example 7 | 2 | 10.1 | 2145 | Amorphous PE | 10.6 | 6 | 5.4 | 18751 | Styrene-acrylic | 9.2 |
| Example 8 | 2 | 10.1 | 2145 | Amorphous PE | 10.6 | 7 | 5.5 | 18635 | Styrene-acrylic | 9.2 |
| Example 9 | 2 | 10.1 | 2145 | Amorphous PE | 10.6 | 8 | 7.5 | 18448 | Styrene-acrylic | 9.2 |
| Example 10 | 2 | 10.1 | 2145 | Amorphous PE | 10.6 | 9 | 7.6 | 18527 | Styrene-acrylic | 9.2 |
| Example 11 | 5 | 9.1 | 2235 | Amorphous PE | 10.6 | 2 | 6.5 | 18751 | Styrene-acrylic | 9.2 |
| Example 12 | 6 | 9.2 | 2468 | Amorphous PE | 10.6 | 2 | 6.5 | 18751 | Styrene-acrylic | 9.2 |
| Example 13 | 7 | 11.7 | 2102 | Amorphous PE | 10.6 | 2 | 6.5 | 18751 | Styrene-acrylic | 9.2 |
| Example 14 | 8 | 11.8 | 2265 | Amorphous PE | 10.6 | 2 | 6.5 | 18751 | Styrene-acrylic | 9.2 |
| Example 15 | 9 | 10.2 | 8896 | Amorphous PE | 10.6 | 2 | 6.5 | 18751 | Styrene-acrylic | 9.2 |
| Example 16 | 10 | 10.3 | 8512 | Amorphous PE | 10.6 | 2 | 6.5 | 18751 | Styrene-acrylic | 9.2 |
| Example 17 | 2 | 10.1 | 2145 | Amorphous PE | 10.6 | 10 | 6.4 | 21896 | Styrene-acrylic | 9.2 |
| Example 18 | 2 | 10.1 | 2145 | Amorphous PE | 10.6 | 11 | 6.6 | 22358 | Styrene-acrylic | 9.2 |

| | Compatibility between brilliant toner and color toner | | SP value difference SP value | Difference in particle size of | | | |
|---|---|---|---|---|---|---|---|
| | Haze H | Compatible/ Incompatible | A − SP value B | toner particles | \|Es − Ec\| | Brilliance evaluation | Gloss evaluation |
| Example 1 | 32 | Incompatible | 1.4 | 3.8 | 16767 | B | B |
| Example 2 | 33 | Incompatible | 1.4 | 3.6 | 16606 | A | A |
| Com. Ex. 1 | 9 | Compatible | 0 | 3.7 | 2375 | D | D |
| Com. Ex. 2 | 11 | Compatible | 0 | 3.7 | 2214 | D | D |
| Com. Ex. 3 | 18 | Compatible | 0.4 | 3.5 | 2441 | D | D |
| Example 3 | 21 | Incompatible | 0.5 | 3.6 | 2840 | C | C |
| Example 4 | 48 | Incompatible | 2 | 3.5 | 15164 | C | C |
| Example 5 | 53 | Incompatible | 2.1 | 3.7 | 14766 | C | C |
| Example 6 | 31 | Incompatible | 0.5 | 3.7 | 16355 | A | A |
| Example 7 | 33 | Incompatible | 1.4 | 4.7 | 16606 | C | C |
| Example 8 | 32 | Incompatible | 1.4 | 4.6 | 16490 | B | B |
| Example 9 | 34 | Incompatible | 1.4 | 2.6 | 16303 | B | B |
| Example 10 | 32 | Incompatible | 1.4 | 2.5 | 16382 | C | C |
| Example 11 | 33 | Incompatible | 1.4 | 2.6 | 16516 | C | C |
| Example 12 | 31 | Incompatible | 1.4 | 2.7 | 16283 | B | B |

TABLE 1-continued

| | | | | | | | |
|---|---|---|---|---|---|---|---|
| Example 13 | 32 | Incompatible | 1.4 | 5.2 | 16649 | B | B |
| Example 14 | 34 | Incompatible | 1.4 | 5.3 | 16486 | C | C |
| Example 15 | 33 | Incompatible | 1.4 | 3.7 | 9855 | C | C |
| Example 16 | 32 | Incompatible | 1.4 | 3.8 | 10239 | B | B |
| Example 17 | 34 | Incompatible | 1.4 | 3.7 | 19751 | B | B |
| Example 18 | 31 | Incompatible | 1.4 | 3.5 | 20213 | C | C |

*Com. Ex.: Comparative Example

Abbreviations in the table will be described below.

Type of Resin

Amorphous PE: amorphous polyester resin

Crystalline PE: crystalline polyester resin

Others

Particle size of toner particles: volume-average particle size of brilliant toner particles or color toner particles SP value A: solubility parameter of binder resin included in brilliant toner particles SP value B: solubility parameter of binder resin included in color toner particles SP value difference |SP value A−SP value B|: absolute value of difference in solubility parameter between binder resin included in brilliant toner particles and binder resin included in color toner particles The above results show that the toner sets of Examples enable formation of a brilliant image having high glossiness as well as high brilliance.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An electrostatic image developing toner set comprising:

a brilliant toner comprising brilliant toner particles comprising a binder resin and a brilliant pigment; and a color toner comprising color toner particles comprising a binder resin and a colorant other than the brilliant pigment, wherein the binder resin of the brilliant toner particles and the binder resin of the color toner particles are incompatible with each other in that a haze value H is 20 or more and 100 or less, and wherein the color toner has a higher storage modulus at 120° C. than the brilliant toner.

2. The electrostatic image developing toner set according to claim 1, wherein a solubility parameter of the binder resin of the brilliant toner particles and a solubility parameter of the binder resin of the color toner particles are different from each other.

3. The electrostatic image developing toner set according to claim 2, wherein an absolute value of a difference in solubility parameter between the binder resin of the brilliant toner particles and the binder resin of the color toner particles is 0.5 or more and 2.0 or less.

4. The electrostatic image developing toner set according to claim 1, wherein, among the brilliant toner particles and the color toner particles, one comprises an amorphous polyester resin as the binder resin, and the other comprises a styrene-acrylic resin as the binder resin.

5. The electrostatic image developing toner set according to claim 4, wherein the brilliant toner particles comprise the amorphous polyester resin as the binder resin, and wherein the color toner particles comprise the styrene-acrylic resin as the binder resin.

6. The electrostatic image developing toner set according to claim 4, wherein one of the brilliant toner particles and the color toner particles comprises, as the amorphous polyester resin or the styrene-acrylic resin, an amorphous resin comprising an amorphous polyester resin segment and a styrene-acrylic resin segment.

7. The electrostatic image developing toner set according to claim 1, wherein the color toner particles have a volume-average particle size of 5.5 μm or more and 7.5 μm or less.

8. The electrostatic image developing toner set according to claim 7, wherein the color toner particles have a smaller volume-average particle size than the brilliant toner particles, and wherein an absolute value of a difference in volume-average particle size between the brilliant toner particles and the color toner particles is 2.7 μm or more and 5.2 μm or less.

9. The electrostatic image developing toner set according to claim 1, wherein an absolute value (|Es−Ec|) of a difference between the storage modulus Es of the brilliant toner at 120° C. and the storage modulus Ec of the color toner at 120° C. is 10,000 Pa or more and 20,000 Pa or less.

10. An electrostatic image developing toner set comprising:

a brilliant toner comprising brilliant toner particles comprising a binder resin and a brilliant pigment; and a color toner comprising color toner particles comprising a binder resin and a colorant other than the brilliant pigment, wherein the binder resin of the brilliant toner particles and the binder resin of the color toner particles are incompatible with each other in that a haze value H is 20 or more and 100 or less, wherein the brilliant toner particles and the color toner particles each comprise a release agent, and wherein an absolute value of a difference in solubility parameter between the release agent of the brilliant toner particles and the binder resin of the color toner particles is larger than an absolute value of a difference in solubility parameter between the release agent of the brilliant toner particles and the binder resin of the brilliant toner particles.

11. An electrostatic image developing toner set comprising:

a brilliant toner comprising brilliant toner particles comprising a binder resin and a brilliant pigment; and a color toner comprising color toner particles comprising a binder resin and a colorant other than the brilliant pigment, wherein an absolute value of a difference in solubility parameter between the binder resin of the brilliant toner particles and the binder resin of the color toner particles is 0.5 or more and 2.0 or less, wherein the binder resin of the brilliant toner particles and the binder resin of the color toner particles are incompatible with each other in that a haze value H is 20 or more and 100 or less, and wherein the color toner has a higher storage modulus at 120° C. than the brilliant toner.

12. An electrostatic image developer set comprising:

a first electrostatic image developer comprising the brilliant toner of the electrostatic image developing toner set according to claim 1; and a second electrostatic image developer comprising the color toner of the electrostatic image developing toner set according to claim 1.

* * * * *